(12) United States Patent
Nies et al.

(10) Patent No.: US 10,943,741 B2
(45) Date of Patent: Mar. 9, 2021

(54) HIGH CAPACITANCE TUNABLE MULTILAYER CAPACITOR AND ARRAY

(71) Applicant: AVX Corporation, Fountain Inn, SC (US)

(72) Inventors: Craig W. Nies, Greenville, SC (US); Andrew P. Ritter, Simpsonville, SC (US); Richard C. VanAlstine, Piedmont, SC (US)

(73) Assignee: AVX Corporation, Fountain Inn, SC (US)

( * ) Notice: Subject to any disclaimer, the term of this patent is extended or adjusted under 35 U.S.C. 154(b) by 0 days.

(21) Appl. No.: 16/132,537

(22) Filed: Sep. 17, 2018

(65) Prior Publication Data
US 2019/0103228 A1 Apr. 4, 2019

Related U.S. Application Data

(60) Provisional application No. 62/569,757, filed on Oct. 9, 2017, provisional application No. 62/566,848, filed on Oct. 2, 2017.

(51) Int. Cl.
*H01G 7/06* (2006.01)
*H01G 4/12* (2006.01)
*H01G 4/30* (2006.01)
*H01G 4/012* (2006.01)

(52) U.S. Cl.
CPC ..................................... *H01G 7/06* (2013.01)

(58) Field of Classification Search
CPC ............ H01G 4/012; H01G 4/12; H01G 4/30; H01G 4/248; H01G 4/1227; H01G 4/008; H01G 4/228; H01G 7/06
See application file for complete search history.

(56) References Cited

U.S. PATENT DOCUMENTS

| | | | |
|---|---|---|---|
| 3,809,971 A | 5/1974 | Hluchan et al. |
| 5,472,935 A | 12/1995 | Yandrofski et al. |
| 5,589,845 A | 12/1996 | Yandrofski et al. |
| 5,986,864 A | 11/1999 | Davis |
| 6,187,061 B1 | 2/2001 | Amatucci et al. |
| 6,377,142 B1 | 4/2002 | Chiu et al. |
| 6,493,207 B2 | 12/2002 | Nakano et al. |
| 6,514,895 B1 | 2/2003 | Chiu et al. |
| 6,683,782 B2 | 1/2004 | Duva |

(Continued)

FOREIGN PATENT DOCUMENTS

JP 2017127081 A 7/2017

OTHER PUBLICATIONS

International Search Report and Written Opinion for PCT/US2018/051302 dated Feb. 26, 2019, 11 pages.

(Continued)

*Primary Examiner* — Michael P McFadden
(74) *Attorney, Agent, or Firm* — Dority & Manning, P.A.

(57) ABSTRACT

A tunable multilayer capacitor array is provided. The tunable multilayer capacitor includes a plurality of tunable multilayer capacitors that are connected in parallel. The tunable multilayer capacitor has an initial capacitance value greater than about 0.1 microFarads at an operating voltage greater than about 10 volts. The tunable multilayer capacitor is configured to have a tunable capacitance by applying a DC bias voltage to the tunable multilayer capacitor array.

24 Claims, 21 Drawing Sheets

(56) References Cited

U.S. PATENT DOCUMENTS

| | | |
|---|---|---|
| 6,727,535 B1 | 4/2004 | Sengupta et al. |
| 6,737,179 B2 | 5/2004 | Sengupta |
| 6,774,077 B2 | 8/2004 | Sengupta et al. |
| 6,905,989 B2 | 6/2005 | Ellis et al. |
| 6,999,302 B2 | 2/2006 | Ito et al. |
| 7,145,415 B2 | 12/2006 | Sengupta et al. |
| 7,329,976 B2 | 2/2008 | Shirasu et al. |
| 7,393,604 B2 | 7/2008 | Rocke et al. |
| 7,557,055 B2 | 7/2009 | Zhang et al. |
| 7,738,237 B2 | 6/2010 | Lee |
| 7,869,187 B2 | 1/2011 | McKinzie, III |
| 7,893,561 B2 | 2/2011 | Weidenheimer et al. |
| 7,936,553 B2 | 5/2011 | Oakes et al. |
| 8,009,407 B2 | 8/2011 | Leidl et al. |
| 8,112,852 B2 | 2/2012 | Mendolia et al. |
| 8,243,417 B2 | 8/2012 | Kanno et al. |
| 8,354,166 B2 | 1/2013 | Tan et al. |
| 8,699,204 B2 | 4/2014 | Demcko et al. |
| 8,891,226 B2 | 11/2014 | Lee et al. |
| 9,001,486 B2 | 4/2015 | Anthony et al. |
| 9,019,679 B2 | 4/2015 | Anthony et al. |
| 9,041,491 B2 | 5/2015 | Sato et al. |
| 9,047,524 B2 | 6/2015 | Ikemoto et al. |
| 9,318,266 B2 | 4/2016 | Capanu et al. |
| 9,390,857 B2 | 7/2016 | Tan et al. |
| 9,397,632 B2 | 7/2016 | Tan et al. |
| 9,627,141 B2 | 4/2017 | Engel et al. |
| 9,633,786 B2 | 4/2017 | Hattori |
| 9,646,766 B2 | 5/2017 | Ma et al. |
| 9,728,340 B2 | 8/2017 | Ishii et al. |
| 9,819,064 B2 | 11/2017 | Jiang et al. |
| 9,859,843 B2 | 1/2018 | Charley et al. |
| 9,991,597 B2 | 6/2018 | Velandia Torres |
| 10,276,308 B2 | 4/2019 | Charley |
| 10,431,388 B2 | 10/2019 | Ritter et al. |
| 2004/0175585 A1 | 9/2004 | Zou et al. |
| 2004/0178867 A1 | 9/2004 | Rahman et al. |
| 2007/0030100 A1 | 2/2007 | Rahman et al. |
| 2008/0068801 A1 | 3/2008 | Wilk |
| 2008/0180883 A1* | 7/2008 | Palusinski ............ H01G 4/06 361/524 |
| 2008/0199737 A1 | 8/2008 | Kazaryan et al. |
| 2010/0188799 A1 | 7/2010 | Galvagni et al. |
| 2012/0257324 A1* | 10/2012 | Ma ............ C04B 35/491 361/301.4 |
| 2013/0286534 A1 | 10/2013 | Ikehashi et al. |
| 2014/0247534 A1 | 9/2014 | Sato et al. |
| 2016/0268052 A1 | 9/2016 | Gando et al. |
| 2017/0019086 A1* | 1/2017 | Dueweke ............ H01G 5/18 |
| 2017/0162335 A1 | 6/2017 | Ritter et al. |
| 2018/0190436 A1 | 7/2018 | Duwel et al. |

OTHER PUBLICATIONS

Related Application Form.
Abstract of Japanese Patent—JPH0878285, Mar. 22, 1996, 2 pages.
Abstract of Japanese Patent—JP2008066682, Mar. 21, 2008, 2 pages.
Abstract of WO2015001222 (A1), dated Jan. 8, 2015, 22 pages.
Product Information—TurboCap™ High-CV SMPS Capacitors from AVX Corporation, May 2015, 3 pages (49-51).
Related U.S. Application Form.
Dielectric Properties and Ferroelectric Phase Transition of Non-linear Tunable Barium Calcium Tin Titanate Ceramic, by Gu Huihua, Chinese Doctoral Dissertations/Masters' Theses Full-text Database (Master) Engineering Science and Technology I, Edition 09, 2006, 5 pages.

* cited by examiner

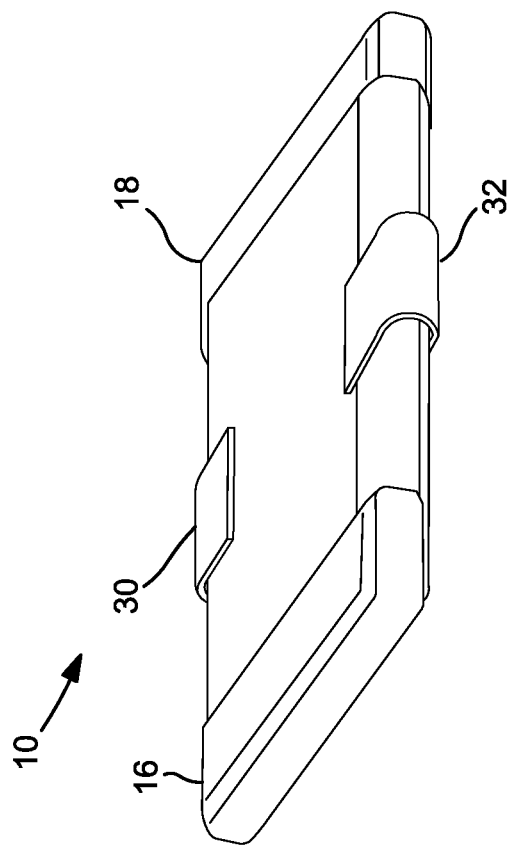
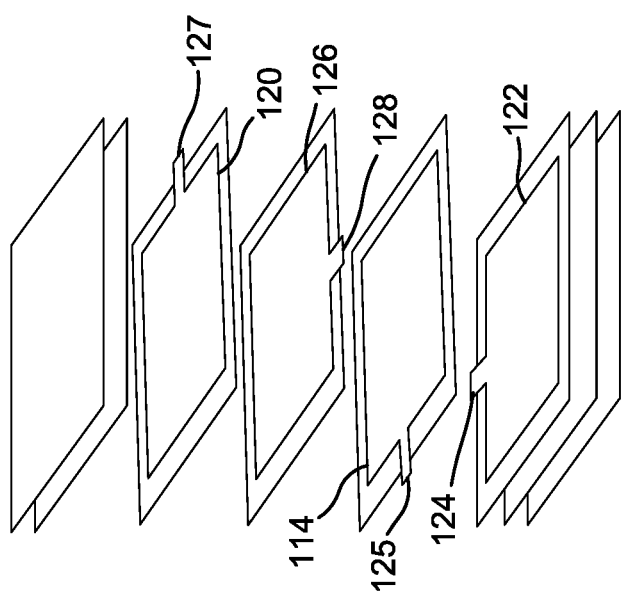
FIG. 7D
FIG. 7C

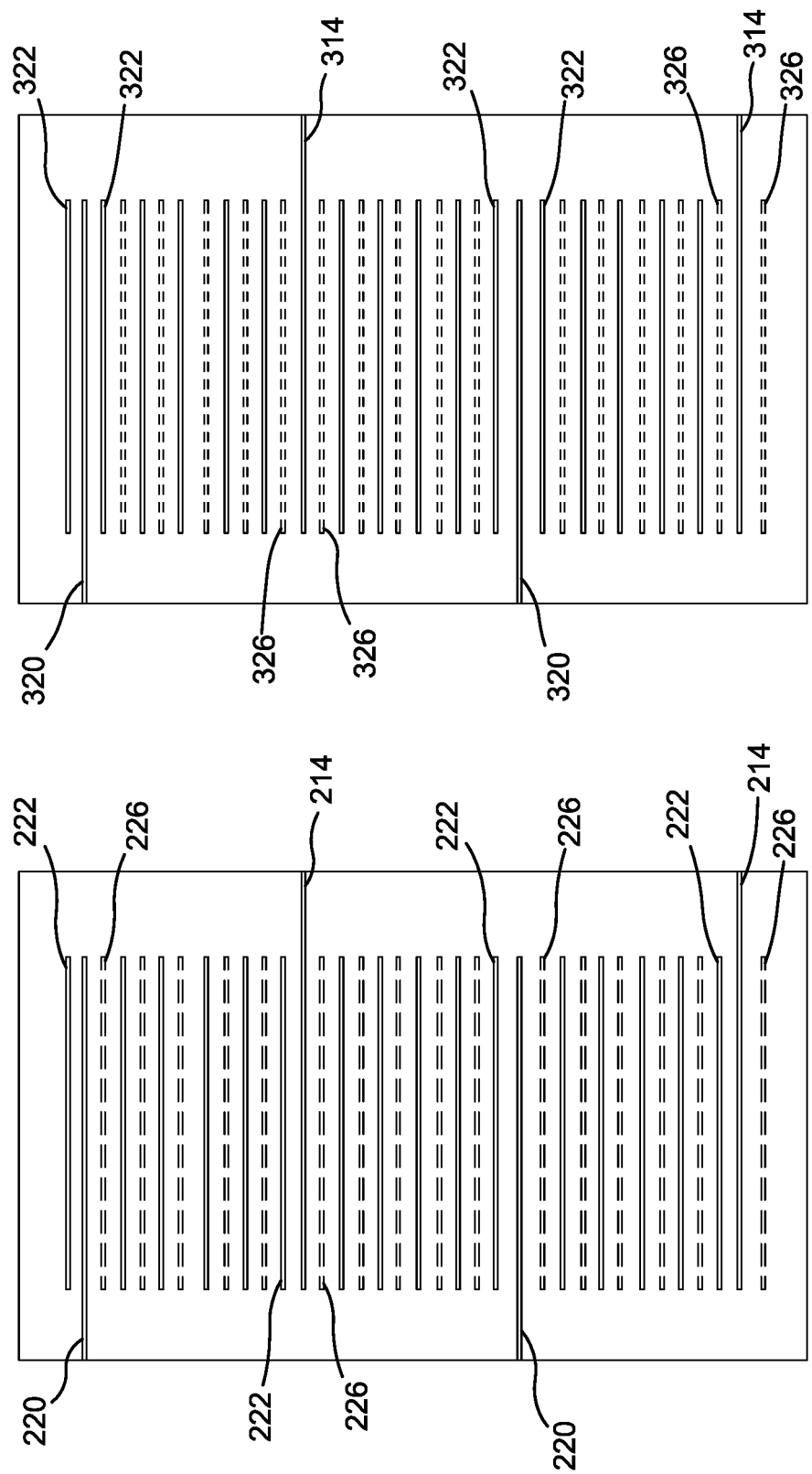

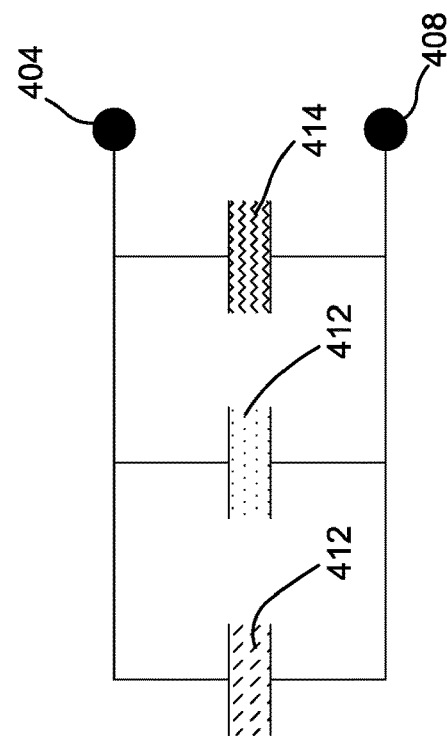
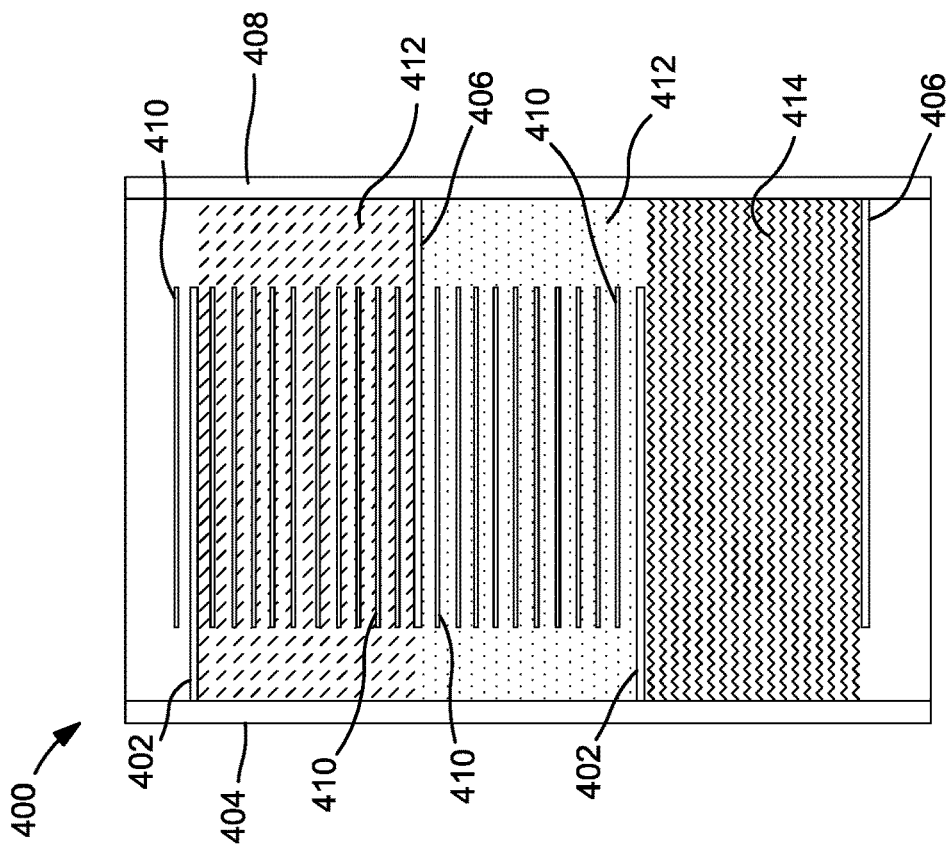
FIG. 9B
FIG. 9A

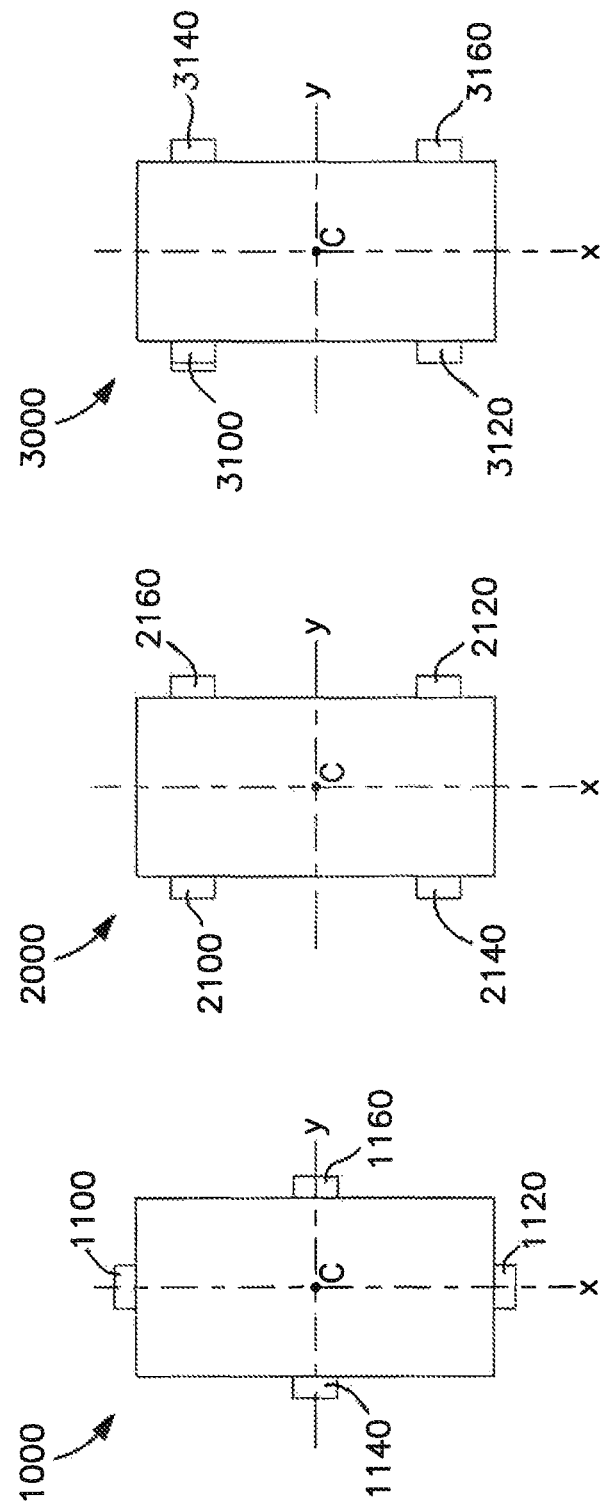

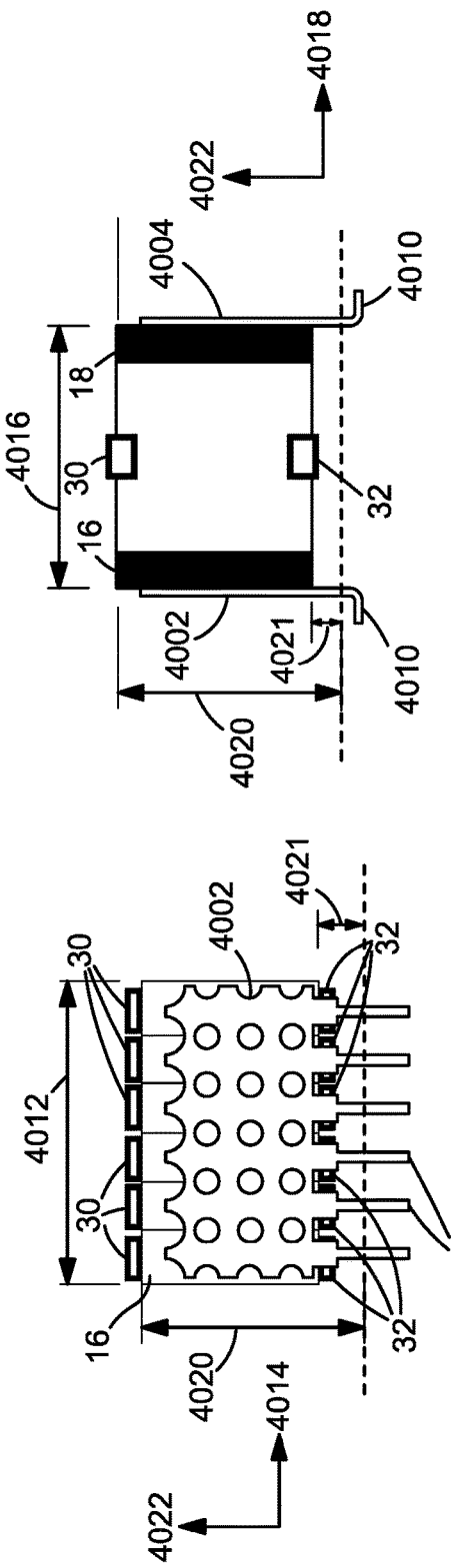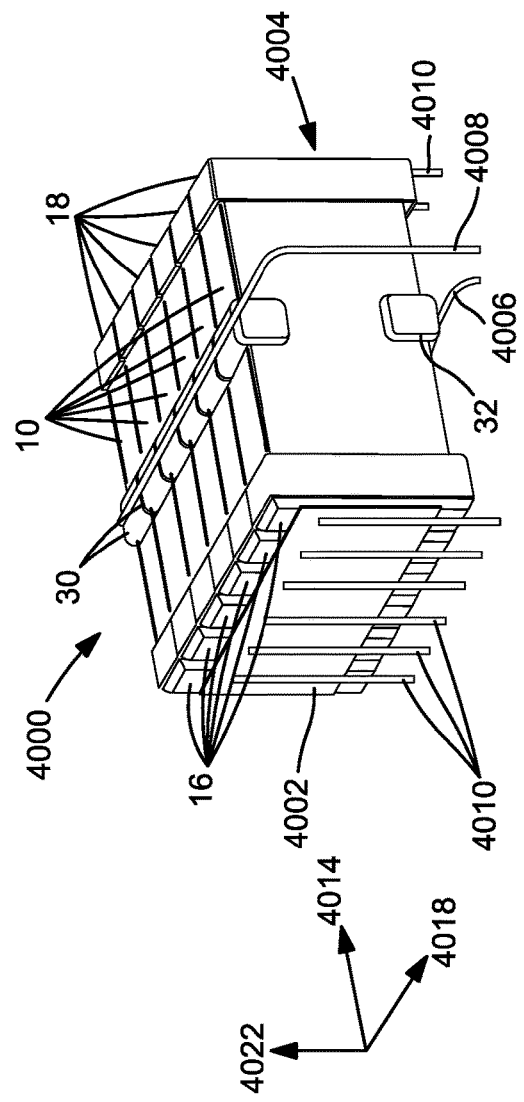

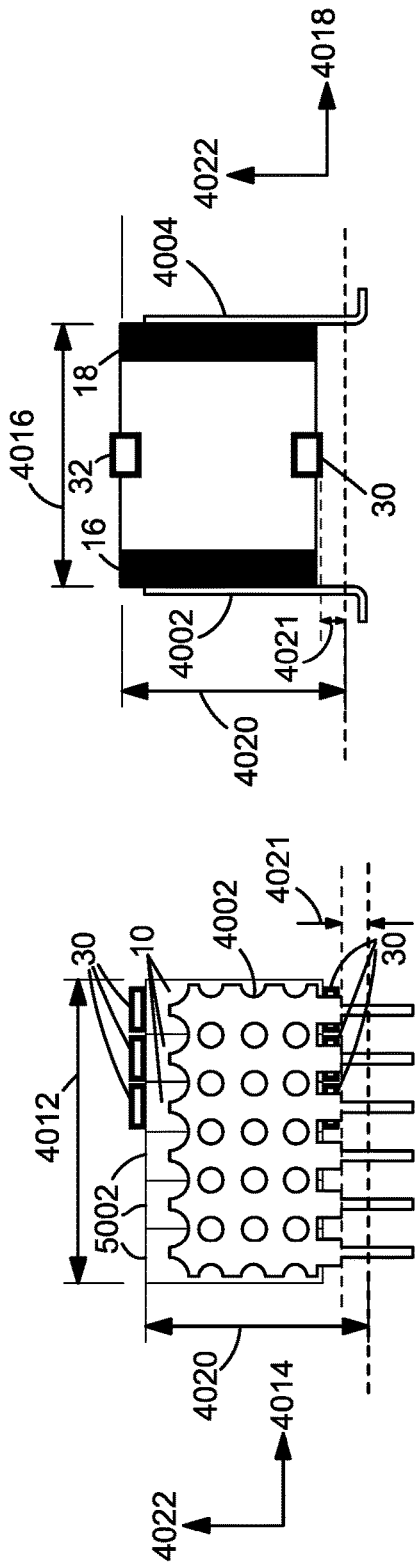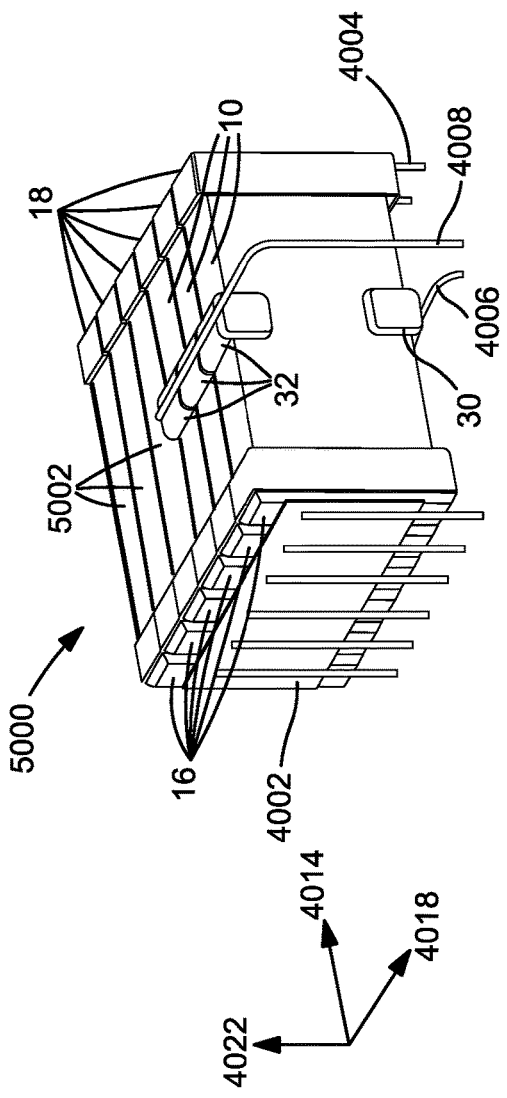

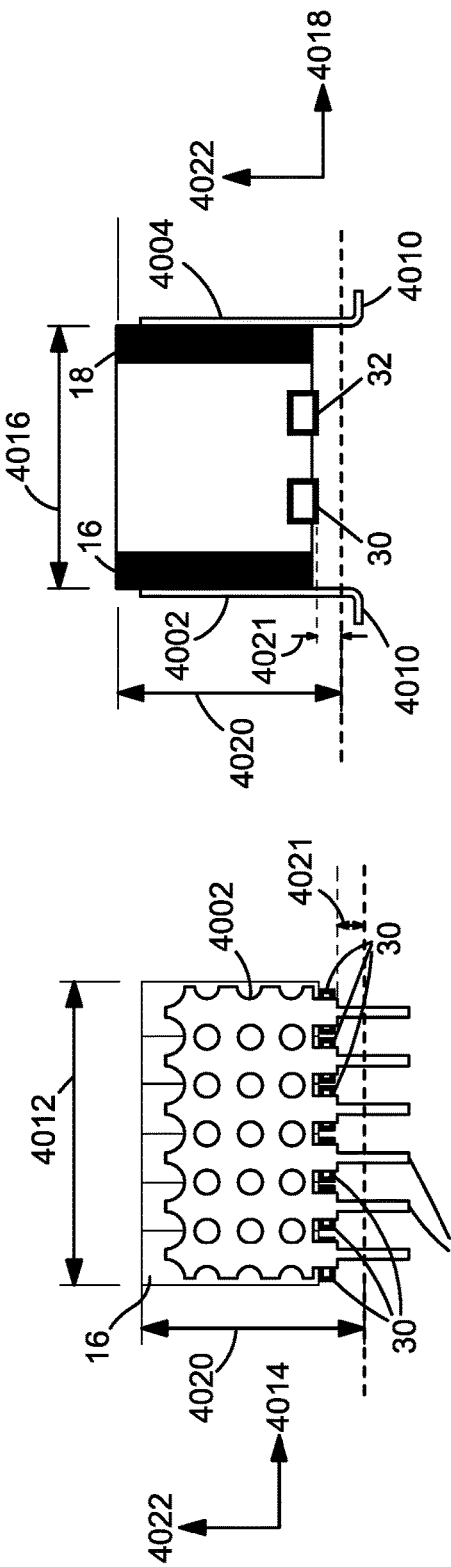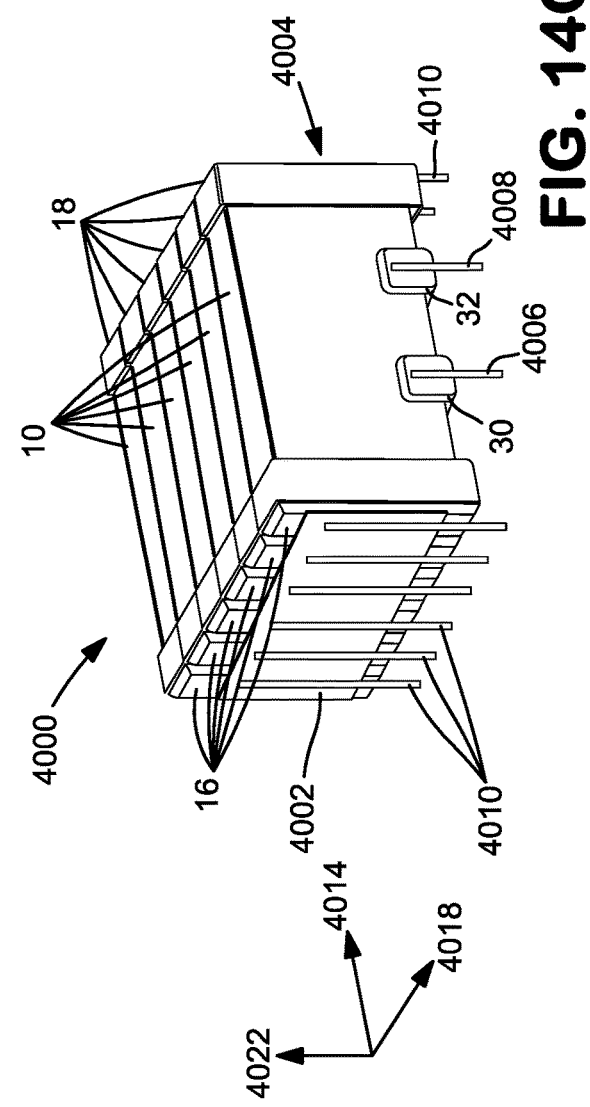

HIGH CAPACITANCE TUNABLE MULTILAYER CAPACITOR AND ARRAY

CROSS REFERENCE TO RELATED APPLICATIONS

The present application claims filing benefit of U.S. Provisional Patent Application Ser. Nos. 62/566,848 having a filing date of Oct. 2, 2017, and 62/569,757 having a filing date of Oct. 9, 2017, which are incorporated herein by reference in their entirety.

BACKGROUND OF THE INVENTION

Tunable capacitors have been proposed in various applications that rely on the variable dielectric properties of the dielectric. For such capacitors, the capacitance at zero bias is typically near its maximum and the capacitance drops with applied voltage. The change in capacitance allows these units to be used to create tunable circuits in filters, matching networks, resonant circuits and other applications from audio to RF and microwave frequencies. Despite their benefits, the use of such capacitors has been relatively limited due in part to the relatively low capacitance values achieved at high power and voltage levels. As such, a need currently exists for a voltage tunable capacitor having improved properties that can be employed in a wider range of possible applications.

SUMMARY OF THE INVENTION

In accordance with one embodiment of the present disclosure, a tunable multilayer capacitor array is disclosed. The tunable multilayer capacitor includes a plurality of tunable multilayer capacitors that are connected in parallel. The tunable multilayer capacitor has an initial capacitance value greater than about 0.1 microFarads at an operating voltage greater than about 10 volts. The tunable multilayer capacitor is configured to have a tunable capacitance by applying a DC bias voltage to the tunable multilayer capacitor array. The tunable multilayer capacitor has an operating voltage greater than about 10 volts.

In accordance with another embodiment of the present disclosure, a tunable multilayer capacitor is disclosed that includes a first active electrode in electrical contact with a first active termination and a second active electrode in electrical contact with a second active termination. The capacitor also includes a first DC bias electrode in electrical contact with a first DC bias termination and a second DC bias electrode in electrical contact with a second DC bias termination. The capacitor also includes a plurality of dielectric layers disposed between the first and second active electrodes and between the first and second bias electrodes. At least a portion of the dielectric layers contain a tunable dielectric material that exhibits a variable dielectric constant upon the application of an applied DC voltage across the first and second DC bias electrodes. The tunable multilayer capacitor may have an initial capacitance greater than about 0.1 microFarads at an operating voltage greater than about 10 volts.

In accordance with another embodiment of the present disclosure, a partially tunable multilayer capacitor array is disclosed. The partially tunable multilayer capacitor array includes a tunable multilayer capacitor that is configured to have a tunable capacitance by applying a DC bias voltage to the partially tunable multilayer capacitor array. The partially tunable multilayer capacitor array also comprises a non-tunable multilayer capacitor that is connected in parallel with the tunable multilayer capacitor. The non-tunable multilayer capacitor has a capacitance value that is not tunable upon the application of the DC bias voltage to the partially tunable multilayer capacitor array.

In accordance with another embodiment of the present disclosure, a partially tunable multilayer capacitor is disclosed. The partially tunable multilayer capacitor includes a first active electrode in electrical contact with a first active termination and a second active electrode in electrical contact with a second active termination. The partially tunable multilayer capacitor also includes a first DC bias electrode in electrical contact with a first DC bias termination and a second DC bias electrode in electrical contact with a second DC bias termination. The partially tunable multilayer capacitor also includes a plurality of dielectric layers disposed between the first and second active electrodes and between the first and second bias electrodes. At least a portion of the dielectric layers contain a tunable dielectric material that exhibits a variable dielectric constant upon the application of an applied DC voltage across the first and second DC bias electrodes. A non-tunable portion of the plurality of dielectric layers does not exhibit a variable capacitance upon application of the applied DC voltage across the first and second DC bias electrodes.

In accordance with another embodiment of the present disclosure, a tunable multilayer capacitor array is disclosed. The tunable multilayer capacitor array may include a plurality of tunable multilayer capacitors that are connected in parallel. The tunable multilayer capacitor array may have a horizontal stack configuration. The thicknesses of each of plurality of the tunable multilayer capacitors may extend in a lengthwise direction of the tunable multilayer capacitor array. The tunable multilayer capacitor may be configured to have a tunable capacitance by applying a DC bias voltage to the tunable multilayer capacitor array.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figures in which:

FIGS. 7C and 7D, illustrate, respectively, an exploded internal perspective view and a perspective view of another exemplary embodiment of a 1:1 ratio overlapped symmetric design of a biased multilayer capacitor in accordance with presently disclosed subject matter;

FIG. 8A illustrates a sectional view of an exemplary embodiment of an 11:1 ratio non-shielded asymmetric design of a biased multilayer capacitor in accordance with presently disclosed subject matter;

FIG. 8B illustrates a sectional view of an exemplary embodiment of an 11:1 ratio shielded asymmetric design of a biased multilayer capacitor in accordance with presently disclosed subject matter;

FIGS. 9A and 9B illustrate, respectively, a sectional view and a schematic diagram of an exemplary embodiment of a partially tunable multilayer capacitor in accordance with presently disclosed subject matter;

FIGS. 11A, 11B, and 11C illustrate, respectively, various symmetric orientations that may be employed for the active and bias terminations in certain embodiments of the present invention;

FIGS. 12A, 12B, and 12C illustrate, respectively, a side view, a front view, and a perspective view of an embodiment of a tunable multilayer capacitor array in accordance with aspects of the presently disclosed subject matter;

FIGS. 13A, 13B, and 13C illustrate, respectively, a side view, a front view, and a perspective view of an embodiment of a partially tunable multilayer capacitor array in accordance with aspects of the presently disclosed subject matter; and FIGS. 14A, 14B, and 14C illustrate, respectively, a side view, a front view, and a perspective view of another embodiment of a tunable multilayer capacitor array in accordance with aspects of the presently disclosed subject matter.

Figure 1:
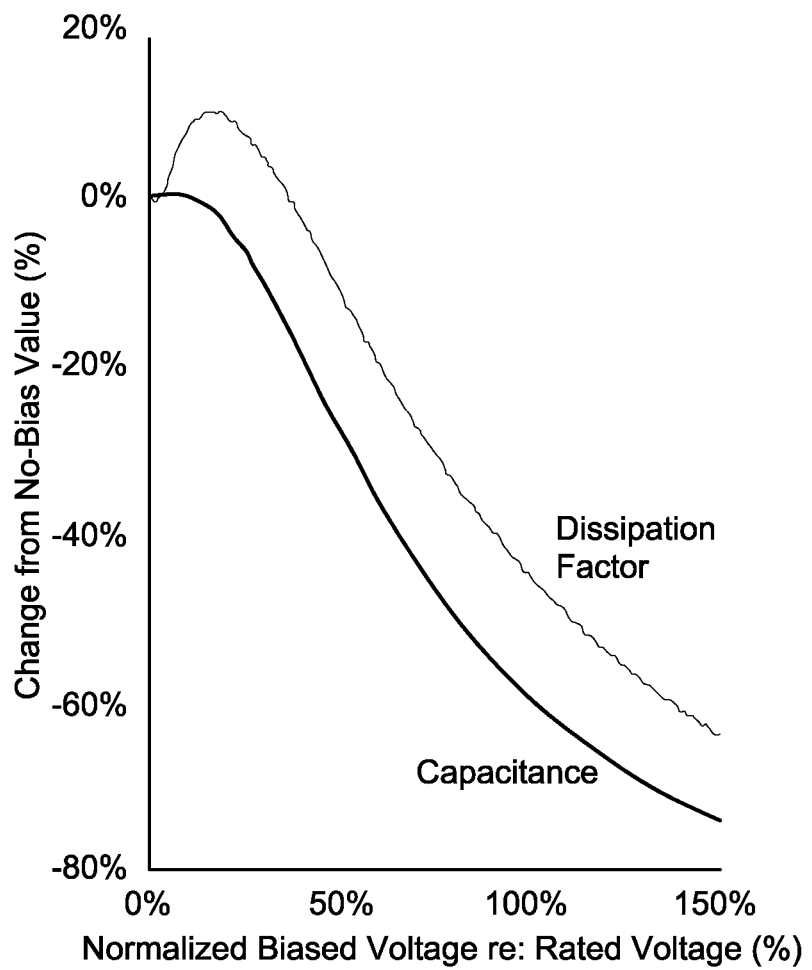
FIG. 1 graphically illustrates the change in capacitance achievable with use of the presently disclosed subject matter, over a range of normalized biasing voltage changes.

Repeat use of reference characters throughout the present specification and appended drawings is intended to represent same or analogous features, elements, or steps thereof.

DETAILED DESCRIPTION OF THE INVENTION

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a multilayer capacitor that contains a plurality of dielectric layers interposed between alternating active electrode layers. At least a portion of the dielectric layers include a tunable material that exhibits a variable dielectric constant upon the application of an applied voltage. More particularly, such materials typically have a "voltage tunability coefficient" within the range of from about 10% to about 90%, in some embodiments from about 20% to about 80%, and in some embodiments, from about 30% to about 70%, wherein the "voltage tunability coefficient" is determined according to the following general equation:

$$T = 100 \times (\varepsilon_0 - \varepsilon_V)/\varepsilon_0$$

wherein,

T is the voltage tunability coefficient;

$\varepsilon_0$ is the static dielectric constant of the material without an applied voltage; and $\varepsilon_V$ is the variable dielectric constant of the material after application of the applied voltage (DC).

The static dielectric constant of the material typically ranges from about 100 to about 25,000, in some embodiments from about 200 about 10,000, and in some embodiments, from about 500 to about 9,000, such as determined in accordance with ASTM D2149-13 at operating temperatures ranging from about −55° C. to about 150° C. (e.g., 25° C.) and frequencies ranging from about 100 Hz to about 1 GHz (e.g., 1 kHz). Of course, it should be understood that the specific value of the static dielectric constant is generally selected based on the particular application for which the capacitor is employed. When applied with an increased DC bias, the dielectric constant generally decreases within the ranges noted above. The tuning voltage applied to induce the desired change in dielectric constant may generally vary relative to the voltage at which the dielectric composition begins to become conductive upon application of an electric field ("breakdown voltage"), which can be determined in accordance with ASTM D149-13 at a temperature of 25° C. In most embodiments, a maximum applied DC bias voltage is about 50% or less, in some embodiments, about 30% or less, and in some embodiments, from about 0.5% to about 10% of the breakdown voltage of the dielectric composition.

Figure 10:
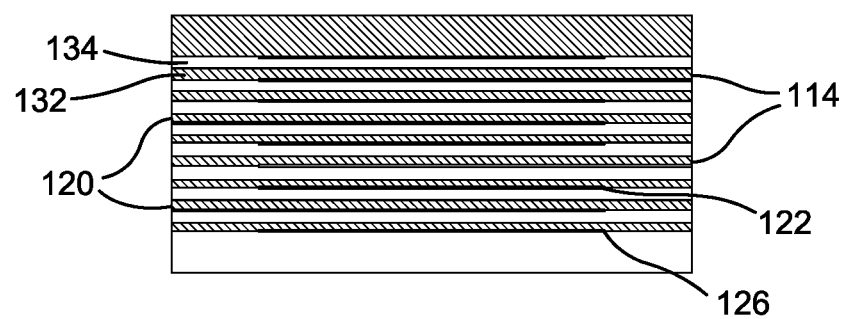
FIG. 10 illustrates a sectional view of an exemplary embodiment of a compositionally blended biased multilayer capacitor in accordance with presently disclosed subject matter.

Any of a variety of tunable dielectric materials may generally be employed as is known in the art. Particularly suitable materials are dielectrics whose base composition includes one or more ferroelectric base phases, such as perovskites, tungsten bronze materials (e.g., barium sodium niobate), layered structure materials (e.g., bismuth titanate). Suitable perovskites may include, for instance, barium titanate and related solid solutions (e.g., barium-strontium titanate, barium calcium titanate, barium zirconate titanate, barium strontium zirconate titanate, barium calcium zirconate titanate, etc.), lead titanate and related solid solutions (e.g., lead zirconate titanate, lead lanthanum zirconate titanate), sodium bismuth titanate, and so forth. In one particular embodiment, for instance, barium strontium titanate ("BSTO") of the formula $Ba_xSr_{1-x}TiO_3$ may be employed, wherein x is from 0 to 1, in some embodiments from about 0.15 to about 0.65, and in some embodiments, from about from 0.25 to about 0.6. Other electronically tunable dielectric materials may be used partially or entirely in place of barium strontium titanate. For instance, one example is $Ba_xCa_{1-x}TiO_3$, wherein x is from about 0.2 to about 0.8, and in some embodiments, from about 0.4 to about 0.6. Other suitable pervoskites may include $Pb_xZr_{1-x}TiO_3$ ("PZT") where x ranges from about 0.05 to about 0.4, lead lanthanum zirconium titanate ("PLZT"), lead titanate ($PbTiO_3$), barium calcium zirconium titanate ($BaCaZrTiO_3$), sodium nitrate ($NaNO_3$), $KNbO_3$, $LiNbO_3$, $LiTaO_3$, $PbNb_2O_6$, $PbTa_2O_6$, $KSr(NbO_3)$ and $NaBa_2(NbO_3)_5KHb_2PO_4$. Still additional complex perovskites may include $A[B1_{1/3}B2_{2/3}]O_3$ materials, where A is $Ba_xSr_{1-x}$ (x can be a value from 0 to 1); B1 is $Mg_yZn_{1-y}$ (y can be a value from 0 to 1); B2 is $Ta_zNb_{1-z}$ (z can be a value from 0 to 1). A potential dielectric material of interest may be formed by combining two end-member compositions in alternating layers, as shown in the exemplary embodiment of FIG. 10. Such end-member compositions may be chemically similar, but differ in the ratios of A-site dopants as discussed above. For example, composition 1 (132 in FIG. 10) may be a perovskite compound of the general formula $(A1_x, A2_{(1-x)})BO_3$ and composition 2 (134) may be a perovskite of the general formula $(A1_y, A2_{(1-y)})BO_3$, where A1 and A2 are from Ba, Sr, Mg, and Ca; the potential B-site members are Zr, Ti and Sn, and "x" and "y" denote the mole fraction of each component. A specific example for compound 1 may be $(Ba_{0.8}Sr_{0.2})TiO_3$ and compound 2 may be $(Ba_{0.6}Sr_{0.4})TiO_3$. These two compounds may be combined in alternating layers in a sintered multilayer capacitor with tunable electrode structures, as shown in FIG. 10, such that the dielectric properties of each material are superimposed. If desired, the perovskite material may also be doped with rare earth oxides ("REO"), such as in an amount less than or equal to 5.0 mole percent, and more preferably from 0.1 to 1 mole percent. Suitable rare earth oxide dopants for this purpose may include, for instance, scandium, yttrium, lanthanum, cerium, praseodymium, neodymium, promethium, samarium, europium, gadolinium, terbium, dysprosium, holmium, erbium, thulium, ytterbium, and lutetium.

Regardless of the particular material employed, the use of a tunable dielectric material can allow for the capacitance of the resulting capacitor to be tuned by applying a DC bias voltage through bias terminations. More particularly, the capacitor contains a set of first active electrodes that are in electrical contact with a first active termination (e.g., input termination) and a set of second active electrodes that are in electrical contact with a second active termination (e.g., output termination). The capacitor also contains a set of first DC bias electrodes that are in electrical contact with a first DC bias termination and a set of second DC bias electrodes that are in electrical contact with a second DC bias termination. When provided in a circuit, a DC power source (e.g., battery, constant voltage power supply, multiple output power supply, DC-DC converters, etc.) can provide a DC bias to the capacitor through the first and second bias terminations, which are typically bipolar in that they have an opposite polarity. The electrodes and terminations may be formed from any of a variety of different metals as is known in the art, such as precious metals (e.g., silver, gold, palladium, platinum, etc.), base metals (e.g., copper, tin, nickel, etc.), and so forth, as well as various combinations thereof. The dielectric layers are interposed between the respective active electrode and bias electrodes.

I. Tunable Multilayer Capacitor

Regardless of the particular configuration employed, the present inventor has discovered that through selective control over the thicknesses and number of the dielectric layers, a compact, tunable capacitor can be achieved that exhibits excellent tunability over a range of high capacitance values at medium to high operating voltages while also providing exceptionally low equivalent series resistance. In some embodiments, these capacitors may be assembled into an array, as described in greater detail in subsequent sections. In other embodiments, these capacitors may be used as individual components. The individual tunable multilayer capacitor may be used in applications where a high capacitance is required, such as at values of 0.1 microFarads ("µF") or more, in some embodiments about 1 µF or more, in some embodiments about 10 µF or more, and in some embodiments 200 µF or more. For instance, such a capacitor may provide tuning capability having initial capacitance values ranging from 0.1 to 100 µF, in some embodiments from about 0.5 µF to about 50 µF, in some embodiments from about 1 µF to about 40 µF, and in some embodiments from about 2 µF to about 30 µF. The degree to which the capacitance can be tuned may vary as desired. For example, the capacitance may be adjusted by from about 10% to about 100% of an initial capacitance of the capacitor, i.e., with no DC bias voltage applied, and in some embodiments from about 20% to about 95%, and in some embodiments, from about 30% to about 80% of the initial capacitance.

As indicated above, the individual tunable capacitor may exhibit low ESR. In some embodiments, the equivalent series resistance (ESR) of the individual tunable capacitor may range from about 50 milliohm (mΩ) or less, in some embodiments about 20 mΩ or less, in some embodiments about 10 mΩ or less. For example, in some embodiments, the ESR of the tunable capacitor may range from about 1 mΩ to about 50 mΩ, in some embodiments from about 5 mΩ to about 40 mΩ, and in some embodiments from about 5 mΩ to about 20 mΩ.

As indicated above, the individual tunable capacitor may operate at medium to high operating voltages. The operating voltage may refer to the DC bias voltage (i.e., the voltage across the bias electrodes) and/or the signal voltage, (i.e., the voltage across the active electrodes). The operating voltage may generally vary relative to the voltage at which the dielectric composition begins to become conductive upon application of an electric field, i.e., the "breakdown voltage", which can be determined in accordance with ASTM D149-13 at a temperature of 25° C. In most embodiments, the operating voltage is about 50% or less, in some embodiments, about 30% or less, and in some embodiments, from about 0.5% to about 10% of the breakdown voltage of the dielectric composition.

For example, the tunable capacitor may operate at AC voltages (e.g., peak-to-peak amplitude) greater than about 10 V, in some embodiments greater than about 50 V, and in some embodiments greater than about 100 V. For example, in some embodiments, the tunable capacitor may operate at voltages ranging from about 10 V to about 300 V, in some embodiments from about 15 V to about 150 V, and in some embodiments from about 20 V to about 100 V. In some embodiments, the tunable capacitor may operate at DC voltages greater than about 10 V, in some embodiments greater than about 50 V, and in some embodiments greater than about 100 V. For example, in some embodiments, the tunable capacitor may operate at voltages ranging from about 10 V to about 300 V, in some embodiments from about 15 V to about 150 V, and in some embodiments from about 20 V to about 100 V. In some embodiments, the tunable capacitor may operate at voltages having both an AC component and a DC component.

Similarly, the tunable capacitor may be tunable using a range of medium to high applied DC bias voltages. For example, in some embodiments, DC bias voltage may be greater than about 10 V, in some embodiments greater than about 50 V, and in some embodiments greater than about 100 V. For example in some embodiments, the DC bias voltage may range from about 10 V to about 300 V, in some embodiments from about 15 V to about 150 V, and in some embodiments from about 20 V to about 100 V.

In some embodiments, the dielectric layers may have thicknesses ranging from about 0.5 micrometer (μm) to about 50 μm, in some embodiments from about 1 μm to about 40 μm, and in some embodiments from about 2 μm to about 15 μm. The electrode layers may have thicknesses ranging from about 0.5 μm to about 3.0 μm, in some embodiments from about 1 μm to about 2.5 um, and in some embodiments from about 1 μm to about 2 μm, e.g., about 1.5 μm.

The total number of active and bias electrode layers may vary. For example, in some embodiments, the total number of active electrode layers may range from 2 to about 1,000, in some embodiments from about 10 to about 700, and in some embodiments from about 100 to about 500. For example, in some embodiments, the total number of bias electrodes may range from 2 to about 1,000, and in some embodiments from about 10 to about 500. It should be understood that the numbers of electrode and bias layers depicted in the Figures and described herein are illustrative only.

In some embodiments, the capacitor may be compact such that it provides a high capacitance while occupying a small volume and/or surface area of a surface to which it mounted. Thus, the capacitor may be well suited for installation on a printed circuit board, for example. The length of the individual capacitor may, for instance, range from about 1 mm to about 50 mm, in some embodiments from about 2 mm to about 35 mm, in some embodiments from about 3 mm to about 10 mm, in some embodiments from about 3 mm to about 7 mm. The width of the individual capacitor may, for instance, range from about 1 mm to about 50 mm, in some embodiments from about 2 mm to about 35 mm, in some embodiments from about 3 mm to about 10 mm, in some embodiments from about 3 mm to about 7 mm.

Similarly, the capacitor may have a low profile suitable for installation on a printed circuit board, for example. The thickness of the individual capacitor may, for instance, range from about 1 mm to about 50 mm, in some embodiments from about 2 mm to about 35 mm, in some embodiments from about 3 mm to about 10 mm, in some embodiments from about 2 mm to about 4 mm.

In alternative embodiments, the initial capacitance value of the tunable multilayer capacitor may be about 100 picoFarads ("pF") or more, in some embodiments about 10,000 pF or more, in some embodiments from about 100,000 pF to about 10,000,000 pF, in some embodiments from about 200,000 pF to 5,000,000 pF, and in some embodiments from about 400,000 pF to about 3,500,000 pF. In some embodiments, the initial capacitance value of the partially tunable multilayer capacitor may range from 0.5 to 50,000,000 pF, in some embodiments from about 100,000 pF to about 10,000,000 pF, in some embodiments from about 200,000 pF to 5,000,000 pF, and in some embodiments from about 400,000 pF to about 3,500,000 pF. Likewise, in other embodiments, the capacitor can be used in applications where a low capacitance is required, such as at values of less than 100 pF, in some embodiments about 50 pF or less, in some embodiments from about 0.5 to about 30 pF, and in some embodiments from about 1 to about 10 pF. The tunable multilayer capacitor may be configured to have any suitable initial capacitance value.

II. Partially Tunable Multilayer Capacitor

Additionally, aspects of the present disclosure are directed to an individual multilayer capacitor that is partially tunable. The partially tunable multilayer capacitor may be tunable with improved resolution, or precision, compared to an equivalent fully tunable multilayer capacitor. In some embodiments, the partially tunable multilayer capacitor may provide a smaller change in capacitance per unit change in applied voltage, resulting in more precise tuning.

The partially tunable multilayer capacitor may be tunable across a smaller range of capacitance values than an equivalent fully tunable multilayer capacitor. For instance, a fully tunable capacitor may be tunable, for example, from about 10% to about 95% of an initial capacitance value. This may be accomplished by applying a DC bias voltage to the fully tunable capacitor that ranges from 0% to 100% of a maximum DC bias voltage. In contrast, a comparably sized partially tunable multilayer capacitor may only be tunable from about 50%, for example, to about 95% of an initial capacitance value across the same applied DC bias voltage range. Thus, the partially tunable multilayer capacitor may provide less change in capacitance per unit change in applied voltage. In some embodiments, the partially tunable multilayer capacitor may be tunable from about 20% to about 95% of an initial capacitance value, in some embodiments from about 30% to about 95%, in some embodiments from about 40% to about 95%, in some embodiments from about 50% to about 95%, in some embodiments from about 60% to about 95%, in some embodiments from about 70% to about 95%, and in some embodiments from about 80% to about 95% of the initial capacitance value.

In some embodiments, the partially tunable multilayer capacitor may be used in applications where a high capacitance is required, such as at values of 0.1 μF or more, in some embodiments about 1 μF or more, in some embodiments about 10 μF or more, and in some embodiments 200 μF or more. For instance, such a capacitor may provide tuning capability having initial capacitance values ranging from 0.1 to 100 μF, in some embodiments from about 0.5 μF to about 50 μF, in some embodiments from about 1 μF to about 40 μF, and in some embodiments from about 2 μF to about 30 μF.

Alternatively, in other embodiments, the initial capacitance value of the partially tunable multilayer capacitor may be about 100 picoFarads ("pF") or more, in some embodiments about 10,000 pF or more, in some embodiments from about 100,000 pF to about 10,000,000 pF, in some embodiments from about 200,000 pF to 5,000,000 pF, and in some embodiments from about 400,000 pF to about 3,500,000 pF. In some embodiments, the initial capacitance value of the partially tunable multilayer capacitor may range from 0.5 to 50,000,000 pF, in some embodiments from about 100,000 pF to about 10,000,000 pF, in some embodiments from about 200,000 pF to 5,000,000 pF, and in some embodiments from about 400,000 pF to about 3,500,000 pF. Likewise, in some alternative embodiments, the capacitor can be used in applications where a low capacitance is required, such as at values of less than 100 pF, in some embodiments about 50 pF or less, in some embodiments from about 0.5 to about 30 pF, and in some embodiments from about 1 to about 10 pF. The partially tunable multilayer capacitor may be configured to have any suitable initial capacitance value.

As indicated above, in some embodiments, the tunable capacitor may provide tunability across a range of high capacitance values in a compact component. The combination of high initial capacitance and a small overall size may be characterized by a high volumetric efficiency. For example, the tunable multilayer capacitor may have an initial volumetric efficiency associated with the initial capacitance value. The initial volumetric efficiency may be calculated as the initial capacitance of the array (i.e., without a DC bias voltage applied) divided by the volume of the array. In some embodiments, the initial volumetric efficiency may be greater than about 10 microFarads per cubic centimeter ("μF/cc"), in some embodiments greater than about 40 μF/cc, in some embodiments greater than 100 μF/cc, and in some embodiments greater than 300 μF/cc. For example, in some embodiments, the initial volumetric efficiency may range from about 10 μF/cc to about 500 μF/cc, in some embodiments from about 20 μF/cc to about 300 μF/cc, in some embodiments from about 40 μF/cc to about 250 μF/cc.

III. Tunable Multilayer Capacitor Array

Aspects of the present disclosure are also directed to a tunable multilayer capacitor array. Regardless of the particular configuration employed, the present inventor has discovered that through selective control over the thicknesses of the dielectric layers in the individual capacitors, the number of the dielectric layers in the individual capacitors, the physical configuration of the capacitors in the array, and the number of capacitors in the array, a compact and tunable capacitor array can be achieved that exhibits excellent tunability over a range of high capacitance values at medium to high operating voltages while also providing exceptionally low equivalent series resistance. Thus, the tunable capacitor array can be used in applications where a high capacitance is required, such as at values of 0.1 μF or more, in some embodiments about 1 μF or more, in some embodiments 10 μF or more, and in some embodiments 1000 μF or more. For instance, such a capacitor may provide tuning capability having initial capacitance values ranging from 0.1 to 1000 μF, in some embodiments from about 1 μF to about 500 μF, in some embodiments from about 5 μF to about 300 μF, and in some embodiments from about 50 μF to about 250 μF. The degree to which the capacitance can be tunable may vary as desired. For example, the capacitance may be adjusted by a value of from about 10% to about 100%, in some embodiments from about 20% to about 95%, and in some embodiments, from about 30% to about 80% of its initial value.

As indicated above, the tunable capacitor array may provide exceptionally low equivalent series resistance (ESR). For example, in some embodiments, the ESR of the tunable capacitor array may be about 10 mΩ or less, in some embodiments about 8 mΩ or less, in some embodiments about 4 mΩ or less. For example, in some embodiments, the ESR of the tunable capacitor array may range from about 0.01 mΩ to about 10 mΩ, in some embodiments from about 0.1 mΩ to about 8 mΩ, in some embodiments from about 1 mΩ to about 4 mΩ.

As indicated above, in some embodiments, the tunable capacitor array may operate at medium to high operating voltages. For example, the tunable capacitor array may operate at voltages greater than about 10 V, in some embodiments greater than about 50 V, and in some embodiments greater than about 100 V. For example, in some embodiments, the tunable capacitor array may operate at voltages ranging from about 10 V to about 300 V, in some embodiments from about 15 V to about 150 V, and in some embodiments from about 20 V to about 100 V.

Similarly, the tunable capacitor array may be tunable across a range of medium to high voltages. For example, in some embodiments, DC bias voltage may be greater than about 10 V, in some embodiments greater than about 50 V, and in some embodiments greater than about 100 V. For example in some embodiments, the DC bias voltage may range from about 10 V to about 300 V, in some embodiments from about 15 V to about 150 V, and in some embodiments from about 20 V to about 100 V.

In some embodiments, the tunable capacitor array may have a "horizontal stack" configuration as explained in greater detail below. This may provide component having a lower profile that provides tuning capability across a range of high capacitance values. Additionally the "horizontal stack" configuration may provide improved mechanical stability and heat dissipation.

The combination of a high capacitance and a small overall size may be characterized by a high volumetric efficiency. For example, the tunable multilayer capacitor array may have an initial volumetric efficiency associated with the initial capacitance value. The initial volumetric efficiency may be calculated as the initial capacitance of the array, i.e., without a DC bias voltage applied, divided by the volume of the array. In some embodiments, the initial volumetric efficiency may be greater than about 10 μF/cc, in some embodiments greater than about 40 μF/cc, in some embodiments greater than 100 μF/cc, and in some embodiments greater than 300 μF/cc. For example, in some embodiments, the initial volumetric efficiency may range from about 10 μF/cc to about 500 μF/cc, in some embodiments from about 20 μF/cc to about 300 μF/cc, in some embodiments from about 40 μF/cc to about 250 μF/cc.

In some embodiments, the capacitor array may be compact such that it provides a high capacitance while occupying a small surface area of a surface to which it mounted. Thus, the capacitor array may be well suited for installation on a printed circuit board, for example. The length of the capacitor array may, for instance, range from about 5 millimeter (mm) to about 50 mm, and in some embodiments from about 10 mm to about 30 mm. The width of the capacitor array may, for instance, range from about 3 mm to about 15 mm, and in some embodiments from about 5 mm to about 10 mm.

Similarly, the capacitor array may have a low profile suitable for installation on a printed circuit board, for example. In some embodiments, the height of the capacitor array may, for instance, range from about 3 mm to about 15 mm, and in some embodiments from about 4 mm to about 10 mm.

In some embodiments, the tunable capacitor array may include 2 to 24 capacitors, in some embodiments 3 to 12 capacitors, and in some embodiments 4 to 6 capacitors. In other embodiments, the tunable capacitor array may include greater than 24 capacitors.

IV. Partially Tunable Multilayer Capacitor Array

Additionally, in some embodiments, a partially tunable multilayer capacitor array may provide improved tuning resolution, or precision, in a manner similar to the partially tunable multilayer capacitor described above. In some embodiments, the partially tunable multilayer capacitor array may include both tunable capacitors and non-tunable capacitors that are connected in parallel, for example. This may provide an array with a high initial capacitance value that is tunable with greater precision than a non-tunable multilayer capacitor in a similar manner as discussed above. For example, in some embodiments, the partially tunable multilayer capacitor array may be tunable from about 20% to about 100% of an initial capacitance value (with no applied DC bias voltage), in some embodiments from about 30% to about 95%, in some embodiments from about 40% to about 90%, in some embodiments from about 50% to about 85%, in some embodiments from about 60% to about 85%, in some embodiments from about 70% to about 85%, and in some embodiments from about 80% to about 85% of the initial capacitance value.

In some embodiments, the partially tunable multilayer capacitor array may be used in applications where a high capacitance is required, such as at values of 0.1 µF or more, in some embodiments about 1 µF or more, in some embodiments about 10 µF or more, in some embodiments 100 µF or more, and in some embodiments 1000 µF or more. For instance, such a capacitor may provide tuning capability having initial capacitance values ranging from 0.1 to 1000 µF, in some embodiments from about 0.5 µF to about 500 µF, in some embodiments from about 1 µF to about 50 µF, and in some embodiments from about 2 µF to about 40 µF.

Alternatively, in other embodiments, the initial capacitance value of the partially tunable multilayer capacitor array may be about 100 picoFarads ("pF") or more, in some embodiments about 10,000 pF or more, in some embodiments from about 100,000 pF to about 10,000,000 pF, in some embodiments from about 200,000 pF to 5,000,000 pF, and in some embodiments from about 400,000 pF to about 3,500,000 pF. In some embodiments, the initial capacitance value of the partially tunable multilayer capacitor array may range from 0.5 to 50,000,000 pF, in some embodiments from about 100,000 pF to about 10,000,000 pF, in some embodiments from about 200,000 pF to 5,000,000 pF, and in some embodiments from about 400,000 pF to about 3,500,000 pF. Likewise, in other embodiments, the capacitor array can be used in applications where a low capacitance is required, such as at values of less than 100 pF, in some embodiments about 50 pF or less, in some embodiments from about 0.5 to about 30 pF, and in some embodiments from about 1 to about 10 pF. The partially tunable multilayer capacitor array may be configured to have any suitable initial capacitance value.

In some embodiments, the partially tunable capacitor array may include 2 to 24 capacitors, in some embodiments 3 to 12 capacitors, and in some embodiments 4 to 6 capacitors. In other embodiments, the partially tunable capacitor array may include greater than 24 capacitors.

V. Discussion of Specific Embodiments

Various embodiments of the present invention will now be described in more detail.

FIG. 1 illustrates in graphic form the change in capacitance that can be achieved over a range of normalized biasing voltage changes. Specifically, the horizontal axis graphs a normalized biased voltage as a percentage of the rated voltage of a device, such as from 0% to 150%. As shown, a corresponding change in device effective capacitance is graphed on the vertical axis, as a percentage of change from the capacitance value without any bias. As shown by the graph of such FIG. 1, an increase of 150% in the normalized bias voltage amount approaches towards an 80% decrease in the no-bias capacitance value, along a relatively straight-line curve, as illustrated. In such way, a voltage tunable capacitor device in accordance with the presently disclosed subject matter helps to maximize efficiency over a range of use conditions.

Referring now to FIGS. 2A-2D, one particular embodiment of a capacitor 10 that can be formed in accordance with the present invention will now be described in further detail. As shown, the capacitor 10 contains a plurality of dielectric layers 12 that are stacked alternately relative to two separate sets of active electrodes 14 and 20 and two separate sets of bias electrodes 22 and 26. The capacitor may be a six-sided body, such as a rectangular-shaped body. In the illustrated embodiment, a first active termination 16 is electrically connected to the first active electrodes 14 and a second active termination 18 is electrically connected to the second active electrodes 20. The first bias electrodes 22 are electrically connected with a first DC bias (+) termination 30 via extending members 24 (e.g., tabs) that extend to the side of the capacitor 10. Similarly, the second bias electrodes 26 are electrically connected with a second DC bias (−) termination 32 via extending members 28. Accordingly, the resulting capacitor 10 contains four (4) separate terminations. In some embodiments, the active terminations 16, 18 may wrap around the respective ends of the capacitor 10 to provide larger terminations 16, 18 for electrically connecting the capacitor 10 in a circuit. The DC bias terminations 30, 32 may be configured as strips that do not extend the entire sides of the capacitor 10. In other embodiments, however, the DC bias terminations 30, 32 may instead wrap around the sides of the capacitor 10, and the active terminations 16, 18 may be configured as strips that do not extend the along the entire ends of the capacitor.

Figure 2A:
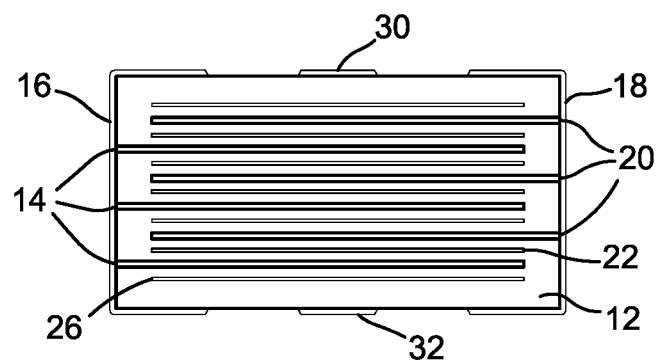
FIGS. 2A, 2B, and 2C illustrate, respectively, a sectional view, an exploded plan view, and an exploded perspective view, of an exemplary embodiment of a four-termination biased multilayer capacitor in accordance with presently disclosed subject matter.
Figure 2B:
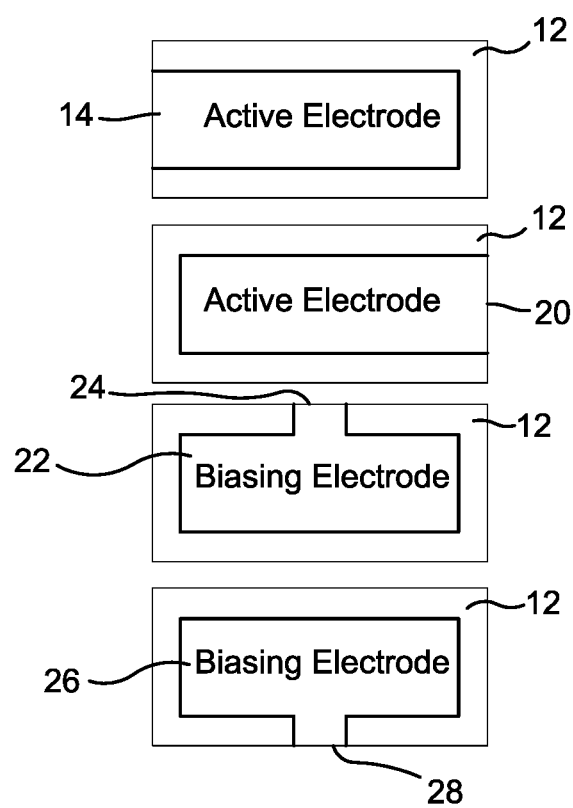
Figure 2C:
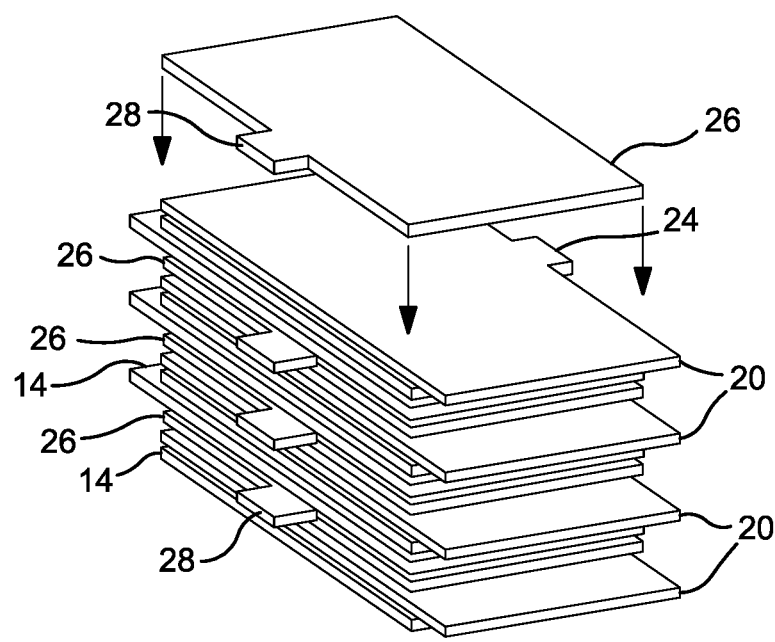
Figure 2D:
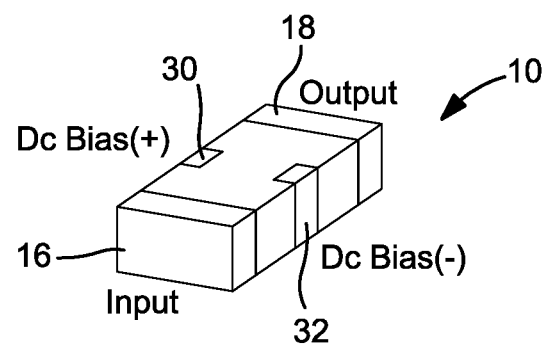
FIG. 2D illustrates a perspective view of an assembled device in accordance with the exemplary embodiment of FIGS. 2A through 2C.
Figure 2E:
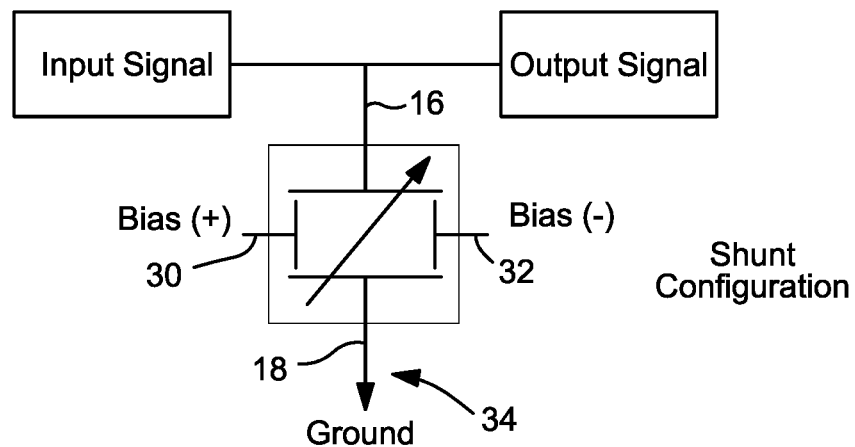
FIGS. 2E and 2F illustrate, respectively, shunt configuration and series configuration representative diagrams of a circuit including the device of FIGS. 2A through 2D.
Figure 2F:
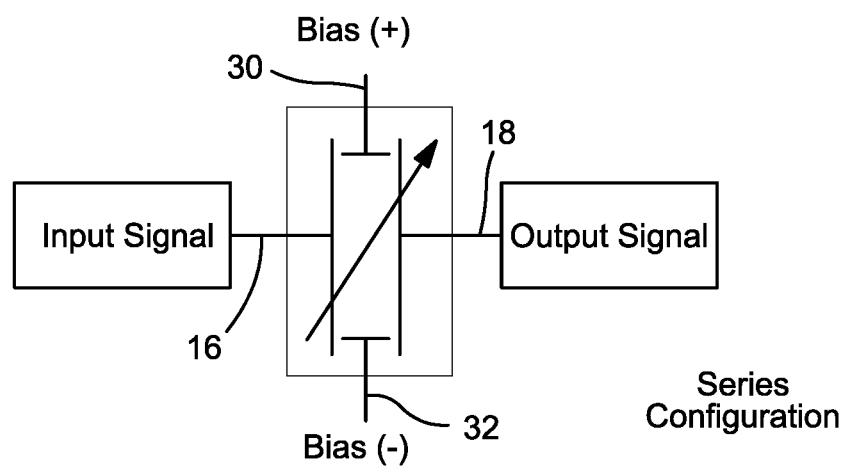

FIGS. 2E and 2F illustrate, respectively, shunt configuration and series configuration representative diagrams of the exemplary embodiment of present FIGS. 2A through 2D. As shown, a ground 34 is also provided relative to the biasing inputs is shown for the shunt configuration.

Figure 3A:
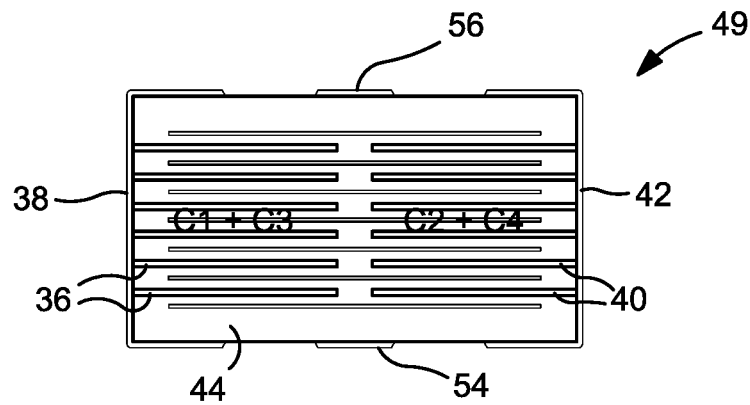
FIGS. 3A, 3B, and 3C illustrate, respectively, a sectional view, an exploded plan view, and an exploded perspective view, of an exemplary embodiment of a four-termination tunable cascade configuration multilayer capacitor in accordance with presently disclosed subject matter.
Figure 3B:
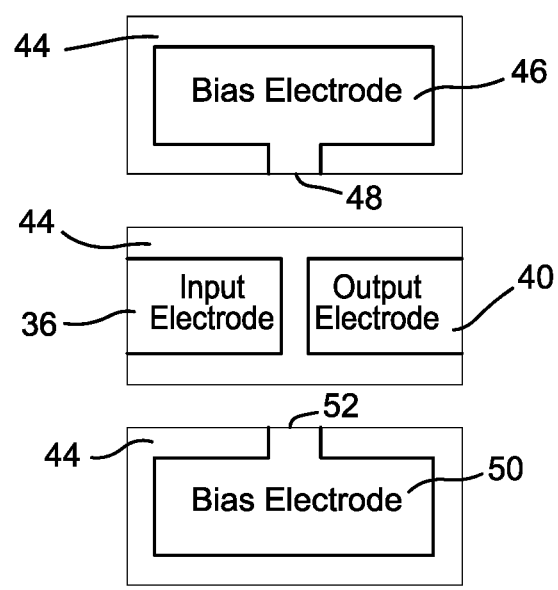
Figure 3C:
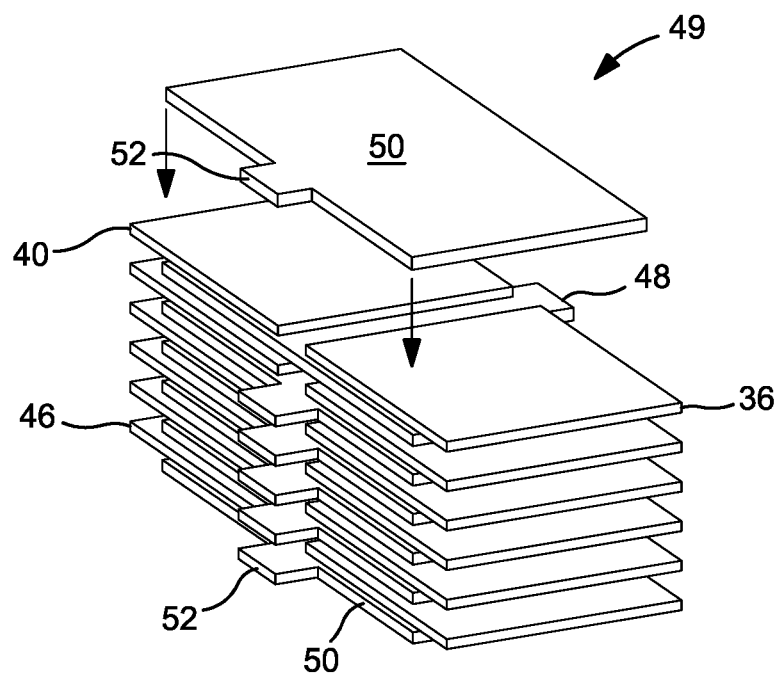
Figure 3D:
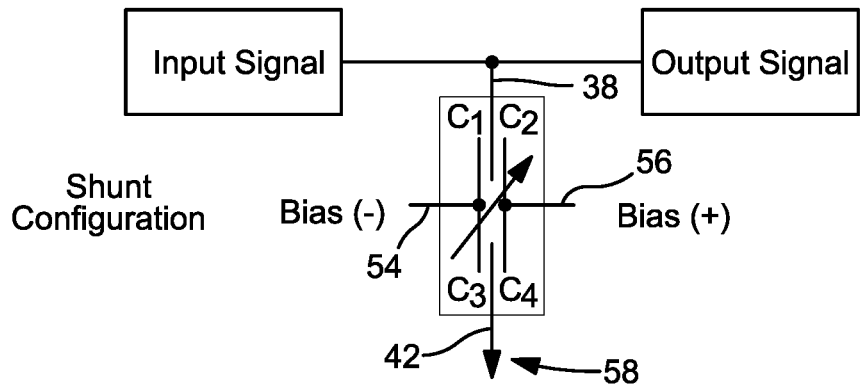
FIGS. 3D and 3E illustrate, respectively, shunt configuration and series configuration representative diagrams of a circuit including the device of FIGS. 3A through 3C.
Figure 3E:
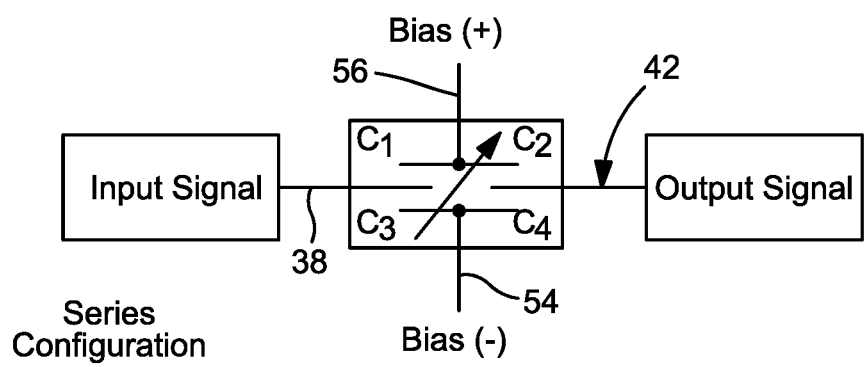

In the embodiment discussed above, the active electrodes are stacked so that each alternate electrode connects to opposite terminations. In certain embodiments, the alternating layers may be connected to the same terminations through the use of a "cascade" configuration in which each set of active electrodes is spaced apart laterally rather than in a stacked manner. One embodiment of such a cascaded capacitor 49 is shown in FIGS. 3A-3C. As depicted, the capacitor 49 contains a plurality of dielectric layers 44 that are arranged relative to two separate sets of active electrodes 36 and 40 and two separate sets of bias electrodes 46 and 50. In the illustrated embodiment, this instance, a first active termination 38 is electrically connected with the first active electrodes 36 and a second active termination 42 is electrically connected to the second active electrodes 40. The first bias electrodes 46 are electrically connected with a first DC bias (−) termination 54 via extending members 48 that extend to the side of the capacitor 49. Similarly, the second bias electrodes 50 are electrically connected with a second DC bias (+) termination 56 via extending members 52. FIGS. 3D and 3E illustrate, respectively, shunt configuration and series configuration representative diagrams of the exemplary embodiment of present FIGS. 3A through 3C. As shown, a ground 58 is also provided relative to the biasing inputs is shown for the shunt configuration.

Figure 4A:
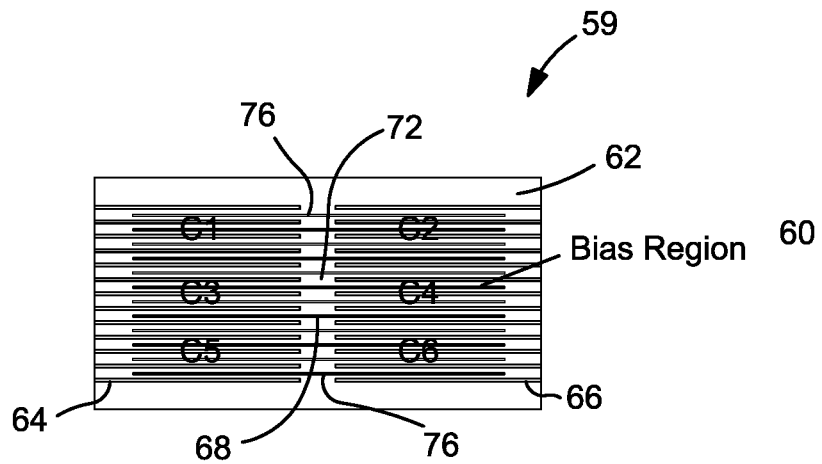
FIGS. 4A and 4B illustrate, respectively, a sectional view and an exploded plan view of an exemplary embodiment of a four-termination tunable partially biased configuration multilayer capacitor in accordance with presently disclosed subject matter.
Figure 4B:
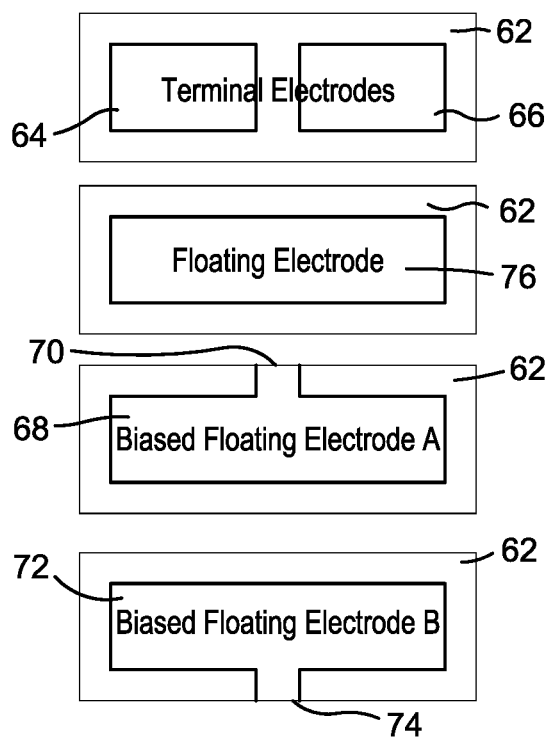
Figure 4C:
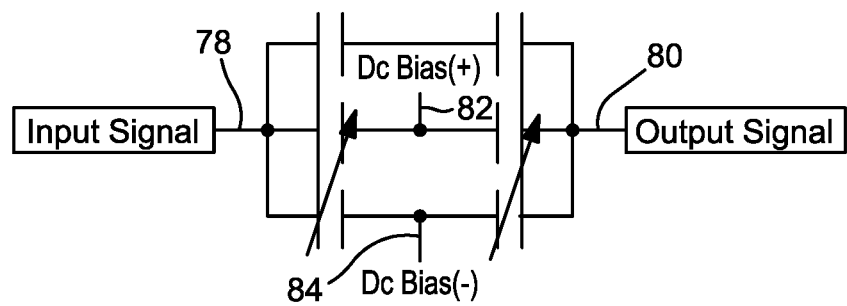
FIG. 4C illustrates a representative diagram of a circuit including the device of FIGS. 4A and 4B.

FIGS. 4A-4C illustrate another embodiment of a capacitor 59 that may be formed in a partially cascaded configuration in accordance with the present invention. The capacitor 59 is considered "partially cascaded" because only a partial region 60 of the total active capacitance region is biased (see FIG. 4A). The addition of biased floating electrodes as illustrated allows application of external voltage to change the dielectric properties of a total capacitance to be determined by other factors and features. As shown by such FIGS., dielectric layers 62 may be stacked alternately relative to first and second sets of active electrodes 64 and 66, first and second sets of bias electrodes 68 and 72, and a plurality of floating electrodes 76. The first active electrodes 64 are electrically connected with a first active termination 78 while the second active electrodes 66 are electrically connected with a second active termination 80. The first bias electrodes 68 are electrically connected with a first DC bias (+) termination 82 via extending members 70 that extend to the side of the capacitor 59. Similarly, the second bias electrodes 72 are electrically connected with a second DC bias (−) termination 84 via extending members 74. It should be understood that the number of electrode layers illustrated in FIG. 4A is illustrative only.

Figure 7B:
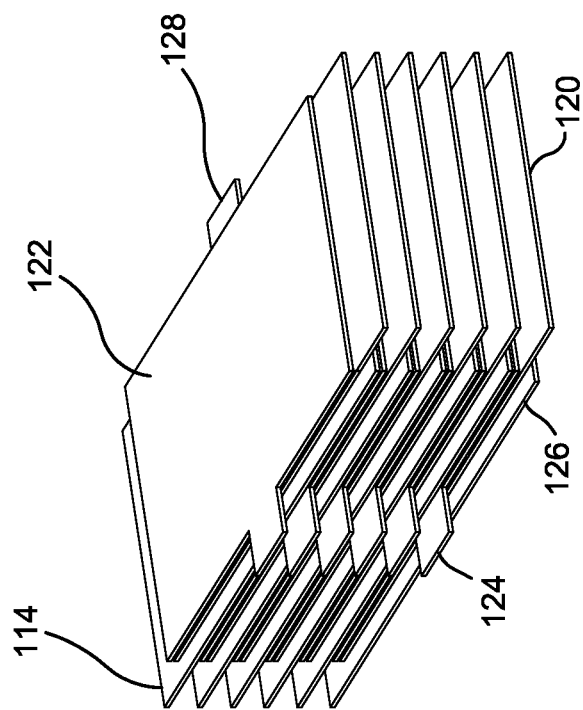
FIGS. 7A and 7B, illustrate, respectively, a sectional view and a partially expanded perspective view, of an exemplary embodiment of a 1:1 ratio overlapped symmetric design of a biased multilayer capacitor in accordance with presently disclosed subject matter.
Figure 7A:
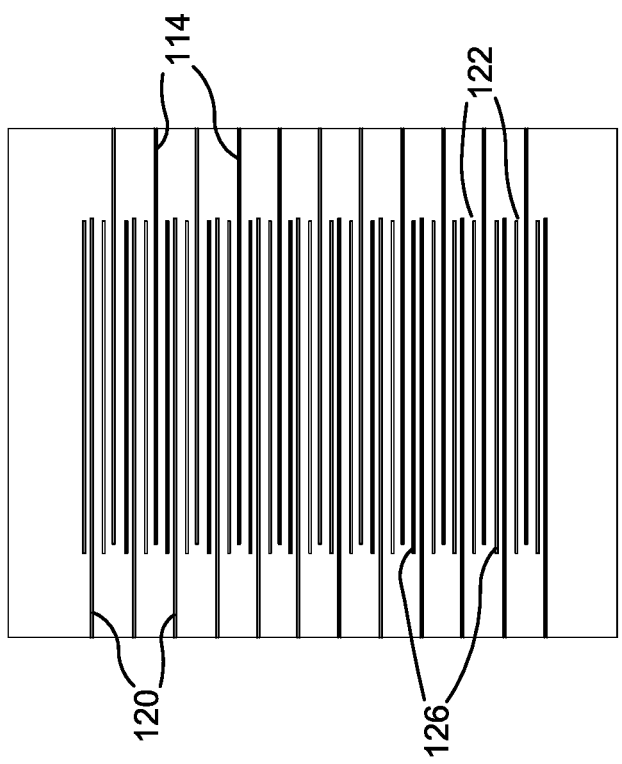

Yet another embodiment in accordance with aspects of the present disclosure is shown in FIGS. 7A and 7B. In this embodiment, first and second sets of active electrodes 114, 120, respectively, are stacked in an alternating 1:1 ratio pattern with first and second sets of bias electrodes 122, 126, respectively. Referring to FIG. 7B, in some embodiments, the leads 124, 128 of the bias electrodes 122, 126, may be configured as protruding tabs. The leads 124, 128 may contact the DC bias terminations 30, 32 in the finished form as illustrated in FIG. 2D. It should be understood that the number of electrode layers illustrated in FIGS. 7A and 7B are illustrative only.

Another embodiment in accordance with aspects of the present disclosure is illustrated in FIGS. 7C and 7D. In this embodiment, the active electrodes 114, 120 may include respective leads 125 and 127 which may be configured as protruding tabs. The leads 125, 127 may be electrically connected with the respective active terminations 16, 18, which are illustrated in FIG. 7D. This may provide improved lamination between the edges of the layers of the capacitor, specifically at the corners of the layers, which may result in a more robust capacitor. Additionally, this configuration may reduce the occurrence of delamination issues during manufacturing.

Additionally, the respective widths of the tabs 124, 125, 126, 127 may be selected to advantageously provide greater electrical contact (e.g., having less resistance) to the respective electrodes 114, 120, 122, 126. Additionally, the widths of the tabs 124, 128 and widths of the terminations 30, 32 that are associated with the DC bias electrodes 122, 126 may be selected to avoid contact between the bias electrode terminations 30, 32 and the signal electrode terminations 16, 18. For example, in some embodiments, the tabs 124, 125, 126, 127 may extend along 10% or more of the edge of the capacitor, in some embodiments 30% or more, and in some embodiments 60% or more. It should be understood that the number of electrode layers illustrated in FIGS. 7A-7D is illustrative only.

Figure 6:
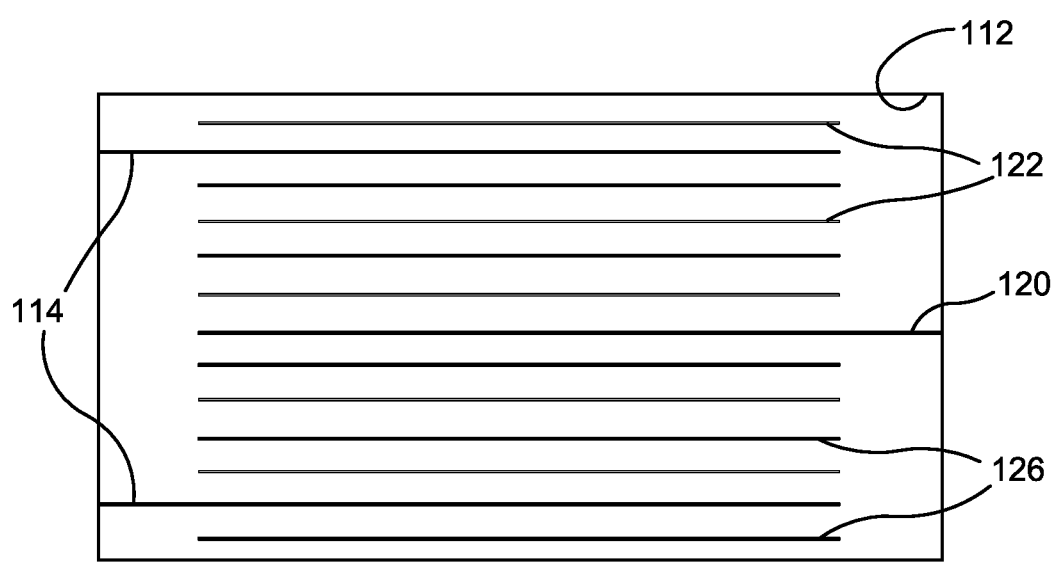
FIG. 6 illustrates a sectional view of an exemplary embodiment of a biased asymmetrical multilayer capacitor in accordance with presently disclosed subject matter.

In the embodiments discussed above, the electrodes are generally employed in a "symmetric" configuration in that the distance (or dielectric thickness) between the first active electrode and the second active electrode is generally the same as the distance between the first bias electrode and the second bias electrode. In certain embodiments, however, it may be desired to vary this thickness to achieve an "asymmetric" configuration. For example, the distance between the first and second active electrodes may be less than the distance between the first and second bias electrodes. In yet other embodiments, the distance between the first and second active electrodes may be greater than the distance between the first and second bias electrodes. Among other things, this may increase the DC field applied for a given level of applied DC bias, which will increase the level of tunability for a given DC bias voltage. Such an arrangement may also allow relatively larger tunability for relatively more modest DC voltages and the use of materials with modest tunability (with potentially lower losses and temperature/frequency variability). While such an asymmetric configuration can be accomplished in a variety of ways, it is typically desired to use additional "floating" bias electrodes between each pair of active electrodes. Referring to FIG. 6, for instance, one embodiment of such an asymmetric capacitor is shown that contains first and second active electrodes 114 and 120, respectively, in conjunction with first and second bias electrodes 122 and 126, respectively.

FIG. 8a illustrates another embodiment of an asymmetric capacitor in which every 11$^{th}$ electrode is an active electrode instead of a bias electrode (11:1 ratio design). In this case, each such respective active electrode (e.g., AC electrode) may be bounded by a pair of DC bias electrode having opposing polarities. Thus, a biasing field may be generated across each AC electrode. Such a configuration may provide capacitive coupling between the AC signal and both polarities of DC bias voltage, and vice versa. Each AC electrode 214, 220 may be disposed between a pair of bias electrodes having opposing polarities 222, 226. A first set of bias electrodes 222 may all have the same polarity, and a second set of bias electrodes 226 (illustrated with dashed lines) may all have opposite respective polarities to the first set of bias electrodes 222. This configuration may provide capacitive coupling between each AC electrode 214, 220 and both DC bias polarities.

FIG. 8b illustrates a sectional view of an exemplary embodiment of an 11:1 ratio "shielded" asymmetric design of a biased multilayer capacitor in accordance with presently disclosed subject matter. This is similar to the example shown in FIG. 8 except that each AC electrode 314, 320 is bounded by a pair of DC electrodes (322 or 326) having the same polarity. One set of bias electrodes 322 may all have the same polarity, and the other set of bias electrodes 326 (illustrated with dashed lines) may all have the opposite polarity. While the material between the two DC electrodes (322 or 326) having the same polarity may not provide tuning, the material may potentially provide shielding to the AC signal, reducing associated noise. Such a configuration may also provide coupling between each of the first set of AC electrodes 314 with a single DC bias polarity only. Similarly such a configuration may provide capacitive coupling between the second set of AC electrodes 320 and the opposite DC bias polarity only. It should be understood that the numbers of electrode layers illustrated in FIGS. 8 and 9 are illustrative only.

FIG. 9A illustrates a sectional view of an exemplary embodiment of a partially tunable multilayer capacitor 400 in accordance with aspects of the presently disclosed subject matter. The partially tunable multilayer capacitor 400 may include a first set of AC electrodes 402 electrically connected with a first active termination 404 and a second set of AC electrodes 406 electrically connected with a second active termination 408. The partially tunable multilayer capacitor 400 may also include DC bias electrodes 410 configured to apply a DC bias voltage across one or more variable dielectric regions 412 such that the dielectric constant of the variable dielectric regions 412 is altered as discussed in greater detail above. The partially tunable multilayer capacitor 400 may also include a non-tunable region 414 that is not tunable with the application of a DC bias voltage. For example, in some embodiments, the non-tunable region 414 may not contain any DC bias electrodes 410. Alternatively, in other embodiments, the non-tunable region 414 may contain electrodes that are not connected with any terminations such that no DC bias voltage may be applied within the non-tunable region 414. Thus, in some embodiments, the capacitance of the dielectric material in the non-tunable section 402 may not be affected by a DC bias voltage being applied across the DC bias electrodes 410.

FIG. 9B illustrates a schematic view of the partially tunable multilayer capacitor illustrated in FIG. 9A. In this embodiment, the non-tunable region 414 is connected in parallel with one or more variable dielectric regions 412. Applying a DC bias voltage across the DC bias terminations may alter the capacitance of the tunable region(s) 412, but not alter the capacitance of the non-tunable region 414. This may result in the partially tunable multilayer capacitor being tunable across a smaller range of capacitance values than an equivalent fully tunable multilayer capacitor. As a result, the change in capacitance per unit change in applied DC bias voltage may be less than an equivalent fully tunable multilayer capacitor. Thus, the partially tunable multilayer capacitor may provide greater tuning resolution, or precision.

In some embodiments, the active and DC bias terminations are disposed symmetrically about an axis of the capacitor. For example, in one embodiment, the capacitor may contain opposing first and second end regions that are spaced apart in a longitudinal direction and opposing first and side regions that are spaced apart in a lateral direction. In certain embodiments, the active terminations may be located at respective end regions of the capacitor while the DC bias terminations may be located at respective side regions of the capacitor. When symmetrically arranged, the active terminations and/or DC bias terminations may be spaced equidistant from a longitudinal and/or lateral axis extending through the geometric center of the capacitor. Referring to FIG. 11(a), for example, one embodiment of a capacitor 1000 is shown that contains a longitudinal axis "x" and a lateral axis "y" that are perpendicular to each other and extend through a geometrical center "C." In this particular embodiment, the capacitor 1000 contains first and second active terminations 1100 and 1120, respectively, which are located at end regions of the capacitor 1000 and centered about both the axes "x" and "y." Similarly, the capacitor 1000 contains first and second bias terminations 1140 and 1160 that are located at side regions of the capacitor 1000 and also centered about both the axes "x" and "y."

In certain embodiments, it may also be desired to locate two or more terminations on the same side of the capacitor. In FIG. 11(b), for instance, one embodiment of a capacitor 2000 is shown that contains a first active termination 2100 and second active termination 2140 that are located on the same side region. The capacitor 2000 also contains a first bias termination 2160 and a second bias termination 2120 that are both located on another side region opposite to that of the active terminations. Despite being located only on the side regions, the active terminations 2100 and 2140 can still be symmetrically arranged in that they are both positioned equidistant from the axes "x" and "y." Similarly, the bias terminations 2160 and 2120 that are also located equidistant from the axes "x" and "y." In the above-referenced embodiments, the first active termination and first bias termination are positioned opposite to the respective second active termination and second bias termination. Of course, this is by no means required. In FIG. 11(c), for instance, a capacitor 3000 is shown that contains first and second active electrode terminations 3100 and 3160, respectively, which are located at opposite side regions in an offset configuration. Nevertheless, the first active termination 3100 and second active termination 3160 are still symmetrically arranged in that they are both positioned equidistant from the axes "x" and "y." Similarly, the capacitor 3000 also contains first and second bias terminations 3120 and 3140 that are located at opposite side regions in an offset configuration yet equidistant from the axes "x" and "y." In other embodiments, the terminations e.g., bias terminations and/or active electrode terminations, may be asymmetrically configured about the "x" and "y" axes described above.

Figure 5:
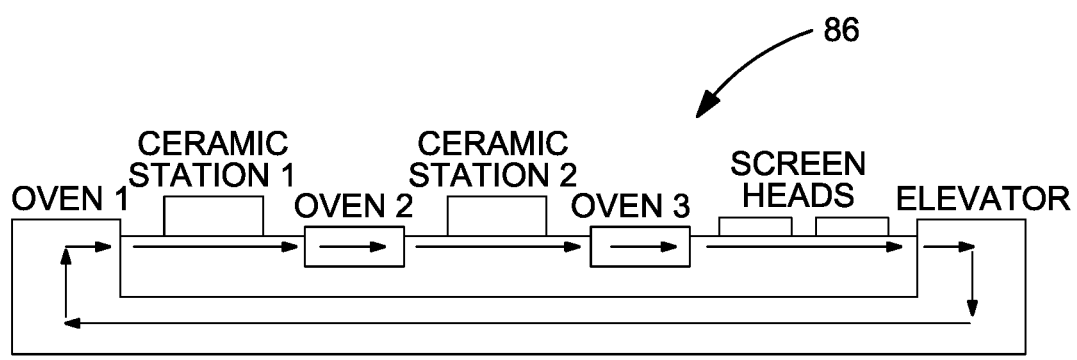
FIG. 5 represents a chip manufacturing automated process (CMAP) exemplary embodiment in accordance with presently disclosed subject matter, usable in manufacturing device exemplary embodiments as disclosed herewith.

The presently disclosed subject matter equally encompasses associated and/or corresponding methodologies for improved voltage tunable devices, including for example, production of such devices, as well as their use in combination with associated circuitry. As further example, FIG. 5 represents a chip manufacturing automated process (CMAP) 86, which is usable in conjunction with manufacturing device exemplary embodiments as disclosed herewith. As shown, the process 86 may include a number of successive stages, involving in some instances three ovens with interceding ceramic stations or other steps/facets such as the use of screen heads or elevator and conveyor features, as representatively shown. Those of ordinary skill in the art will understand that the exact provision of successive steps will depend on which of the exemplary device embodiments disclosed herewith (or modifications thereof) are being produced. Also, the individual steps indicated are only intended as representative of the indicated type of step, and do not denote required use of other aspects beyond the general nature of the steps indicated. For example, the screen head step may involve the use of a stainless steel screen together with an electrode paste for screen pasting of electrode layers, or other technologies for such step may be practiced. For example, more conventional steps of alternate stacking and laminating (with tapes) may be practiced. In either process (or others), those of ordinary skill in the art will recognize that selected steps may be practiced to produce a particular design selected for a given application of the presently disclosed subject matter.

Referring to FIGS. 12A-12C, a tunable multilayer capacitor array 4000 may be formed by arranging individual capacitors 10 in a "horizontal stack" configuration. The individual capacitors may be configured as described with reference to FIGS. 2 and 7, for example. The stacked capacitor array 4000 may provide increased capacitance and reduced ESR compared to a single capacitor 10. Additionally the stacked capacitor array 400 may allow for easier manufacturing and installation, for example, onto a printed circuit board. Additionally, the stacked capacitor array 400 may provide improved mechanical stability and heat dissipation.

In some embodiments, the capacitors 10 of the capacitor array 4000 may be connected in parallel. For example, a first lead frame 4002 may connect each first active termination 16, and a second lead frame 4004 may connect each second active termination 18. A first single lead 4006 may connect each first DC bias termination 30, and a second single lead 4008 may connect each second DC bias termination 32. In some embodiments, the DC bias terminations 30, 32 may wrap around the sides of the capacitor as illustrated in FIGS. 12B and 12C. This configuration may provide improved mechanical and/or electrical connection between the DC bias terminations 30, 32 and the respective bias electrodes to which each bias termination 30, 32 is connected. Additionally, such a configuration may provide improved electrical connection between the various first DC bias terminations 30 and the various second DC bias terminations 32 of adjacent capacitors 10. This may provide a more resilient array 4000.

In other embodiments, the DC bias terminations 30, 32 may be provided only on the side surfaces of the capacitors 10 as illustrated in FIG. 12A. Such a configuration may allow the capacitors 10 to be more closely arranged in the array 4000, resulting in a more compact array 4000, for example.

A DC bias voltage may be applied to each of the capacitors 10 within the array 4000 by applying the DC bias voltage across the first and second single leads 4006, 4008. The single leads 4006, 4008 are omitted from FIGS. 12A and 12B for clarity. Each of the first and second lead frames 4002, 4004 may include a plurality of leads 4010 extending from the capacitor array 4000 for connection in a circuit, for example, to a printed circuit board. In some embodiments, the leads 4010 may be straight as illustrated in FIG. 12A, and in other embodiments, the leads 4010 may be curved outward in a "J" configuration, as illustrated in FIG. 12B. In yet other embodiments, the leads 4010 may be curved inward or have any other suitable configuration for mounting.

The tunable multilayer capacitor array 4000 may have a length 4012 in a lengthwise direction 4014, a width 4016 in a widthwise direction 4018, and a height 4020 in a heightwise direction 4022. Each capacitor 10 may be arranged in a "horizontal stack" configuration such that a thickness of each of plurality of the tunable multilayer capacitors 10 extends in the lengthwise direction 4014 of the array 4000. As illustrated in FIGS. 12A and 12B, the height 4020 of the array 4000 may include a gap distance 4021 between the array 4000 and a surface to which the array 4000 is mounted (illustrated by a dotted line). The gap distance 4021 may be measured between the bottom surface of the array 400 (including the termination 32) and the surface to which the array 4000 is mounted. The lead frames 4002, 4004 may support the array 4000 above the surface. The gap distance 4021 may help to thermally isolate the array 4000 from the surface and/or mechanically de-couple the array 4000 from strain in the surface.

Referring to FIGS. 13A-13C, a partially tunable multilayer capacitor array 5000 may be formed by arranging both tunable multilayer capacitors 10 and non-tunable capacitors 5002, i.e., capacitors that do not have tuning abilities, in a "horizontal stack" configuration. Similar to the embodiment illustrated in FIGS. 12A-12C, the partially tunable multilayer capacitor array 5000 may include a first lead frame 4002 that connects each first active termination 16 of the tunable multilayer capacitors 10, and a second lead frame 4004 that connects each second active termination 19 of the tunable multilayer capacitors 10. Additionally, a first single lead 4006 may connect each first DC bias termination 30 of the tunable multilayer capacitors 10, and a second single lead 4008 may connect each second DC bias termination 32 of the tunable multilayer capacitors 10. The single leads 4006, 4008 are omitted from FIGS. 13A and 13B for clarity. Similar to the array 4000 described with reference to FIGS. 12A-12C, the tunable capacitors 10 of the partially tunable array 5000 may include DC bias terminations 30, 32 that are wrapped around the sides of the capacitors 10 as illustrated in FIGS. 13B and 13C. In other embodiments, the DC bias terminations 30, 32 may be deposited only on the side surfaces of the tunable capacitors, for example, as illustrated in FIG. 13A.

The partially tunable multilayer capacitor array 5000 may provide improved tuning resolution, or precision, in a manner similar to the partially tunable multilayer capacitor 400 described above with reference to FIGS. 9A and 9B. The non-tunable capacitors 5002 may increase the minimum capacitance of the array 5000 when a maximum DC bias voltage is applied across the DC bias electrodes 30, 32 of the array using the single leads 4006, 4008.

Referring to FIGS. 14A-14C, in some embodiments, a bottom-terminated array 6000 may be formed having first and second DC bias terminations 30, 32 arranged along a bottom surface of the array 6000. For example, each capacitor 10 may have respective first and second DC bias terminations 30, 32 that are arranged along the same side. In other embodiments, the DC bias terminations 30, 32 may both be disposed along the top surface of the array 4000. The DC bias terminations 30, 32 may have any suitable configuration, however.

The configuration illustrated in FIGS. 14A-14C may provide advantages, including, for example, easier installation, improved mechanical durability etc. For instance, the DC bias terminations 30, 32 may be more easily connected with respective terminations on a surface to which the array 400 is mounted, e.g., a printed circuit board. In some embodiments, single leads 4006, 4008 may connect the respective DC bias terminations 30, 32 with respective terminations on the mounting surface. In other embodiments, however, the DC bias terminations may be directly connected with respective terminations on the mounting surface by, e.g., soldering, without using single leads 4006, 4008.

Additionally, the bottom-terminated configuration described above may be employed to form a partially tuned capacitor array in a manner similar to the embodiment described with reference to FIGS. 13A-13C. For example, in some embodiments, a combination of bottom-terminated tunable capacitors 10 may be connected in parallel with non-tunable capacitors 5002, in a manner similar to the partially tunable array 5000 described above with reference to FIGS. 13A-13C.

In other embodiments, a first set of tunable capacitors 10 that have DC bias terminations 30, 32 arranged on opposing side surfaces, for example as illustrated in FIGS. 12A-12C, may be used to form an array with a second set of tunable capacitors 10 that have DC bias terminations 30, 32 arranged on the same side surface (e.g., on the bottom surface), for example as illustrated in FIG. 14A-14C. Such a configuration may allow for a first DC bias voltage to be applied to the first set of tunable capacitors 10 and a second DC bias voltage that is different than the first DC bias voltage to be applied to the second set of tunable capacitors 10. This may provide a tunable array 4000 that can be tuned based on two different DC bias voltages. In yet other embodiments, a first set of tunable capacitors 10 that have DC bias terminations 30, 32 arranged on a bottom surface can be connected into an array with a second set of tunable capacitors 10 that have DC bias terminations 30, 32 arranged on a top surface, for example. This configuration may also allow for a first DC bias voltage to be applied to the first set of tunable capacitors 10 and a second DC bias voltage that is different than the first DC bias voltage to be applied to the second set of tunable capacitors 10. This may provide a tunable array 4000 that can be tuned based on two different DC bias voltages.

One of ordinary skill in the art would understand that yet other combinations of tunable capacitors having various configurations as described and illustrated herein are possible to form additional arrays beyond those particularly described herein. Similarly, yet other combinations of tunable and non-tunable capacitors having configuration as described and illustrated herein are possible.

Figure 15:
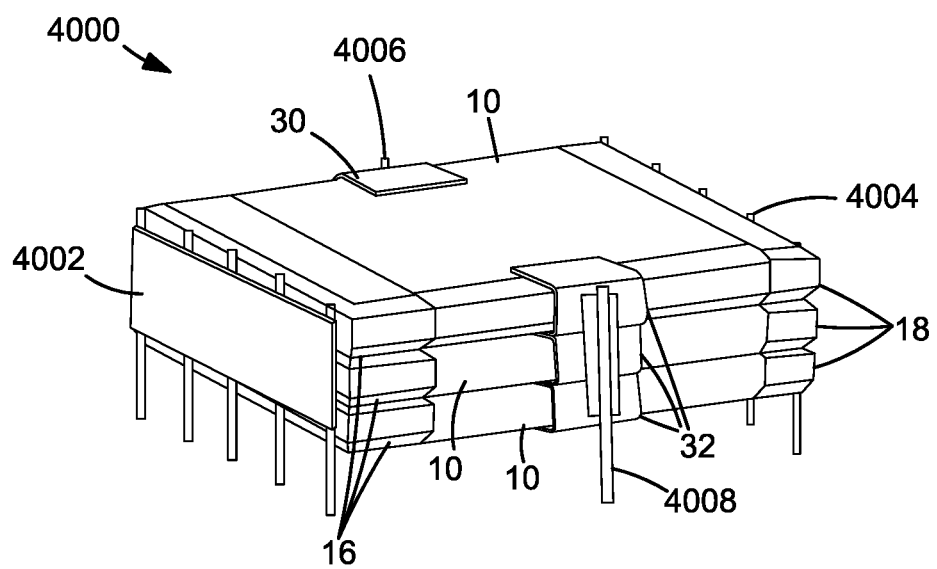
FIG. 15 illustrates a perspective view of an embodiment of a tunable multilayer capacitor array in accordance with aspects of the presently disclosed subject matter.

Referring to FIG. 15, in some embodiments, the capacitor array 4000 may have a vertical stack configuration. The vertical stack capacitor array 4000 may similarly have a first lead frame 4002 connected with some or all of the first active termination 16 and a second lead frame 4004 may connected with some or all of the second active termination 18. A first single lead 4006 may connect some or all first DC bias termination 30, and a second single lead 4008 may connect some or all of the second DC bias termination 32. Thus, the vertical stack capacitor array 4000 may be configured as a fully tunable capacitor array in some embodiments, and as a partially tunable capacitor array in other embodiments. In some embodiments, a vertical stack array may be formed having both bias terminations 30, 32 on the same side, for example using a tunable capacitor 10 configured as the capacitors 10 described above with reference to the bottom-terminated tunable array illustrated in FIGS. 14A-14C. Similarly combinations of different tunable and/or non-tunable capacitors may be combined into a vertical stack array 4000 as described above with reference to the horizontal stack arrays 4000, 5000.

The horizontal stack configuration may described above with reference to FIGS. 12-14 may provide improved mechanical stability for capacitor arrays including a large number of capacitors. For example, for arrays including greater than five capacitors, the height of the vertical stack array may become impractical for mounting to the surface of a printed circuit board, for example. Additionally, the height of such an array may cause the array to become mechanically unstable. However, for arrays having a small number of capacitors, for example five or less capacitors, the vertical stack array may provide a smaller footprint and lower profile.

VI. Applications

The capacitor of the present invention may be employed in a wide variety of applications, including, for example, power conversion circuits. Tunability at high capacitance and voltage may allow for optimization of the performance of the circuit. Additional applications may include point-of-load filter circuits and smoothing capacitors in variable load circuits. Other suitable applications may include, for instance, waveguides, RF applications (e.g., delay lines), antenna structures, matching networks, resonant circuits, and other applications.

Test Methods

Capacitance

The capacitance may be measured according to MIL-STD-202 Method 305, using a Keithley 3330 Precision LCZ meter with a DC bias of 0.0 volts, 1.1 volts, or 2.1 volts (1 volt root-mean-squared sinusoidal signal). The operating frequency is 1 KHz, and the temperature is about 25° C. The relative humidity may be 25% or 85%.

Equivalent Series Resistance (ESR)

Equivalence series resistance may be measured using a Keithley 2400, 2602, or 3330 Precision LCZ meter with a DC bias of 0.0 volts, 1.1 volts, or 2.1 volts (0.5 volt peak-to-peak sinusoidal signal) at an operating frequency of 10 KHz, 50 KHz, or 100 KHz. A variety of temperature and relative humidity levels may be tested. For example, the temperature may be 23° C., 85° C. or 105° C., and the relative humidity may be 25% or 85%.

Examples

Examples of tunable multilayer capacitor arrays in accordance with aspects of the present disclosure are provided in Table 1:

TABLE 1

Example Tunable Multilayer Capacitor Arrays

| Initial Capacitance (µF) | Number of Capacitors | Operating Voltage (volts) | Maximum DC Bias Voltage (volts) |
|---|---|---|---|
| 8.2 | 3 | 100 | 100 |
| 12 | 5 | 100 | 100 |
| 14 | 3 | 100 | 100 |
| 18 | 3 | 50 | 50 |
| 22 | 10 | 100 | 100 |
| 22 | 5 | 100 | 100 |
| 27 | 5 | 50 | 50 |
| 27 | 3 | 50 | 50 |
| 47 | 5 | 50 | 50 |
| 47 | 10 | 100 | 100 |
| 50 | 10 | 50 | 50 |
| 68 | 3 | 25 | 25 |
| 100 | 5 | 25 | 25 |
| 100 | 10 | 50 | 50 |
| 220 | 10 | 25 | 25 |

The initial capacitance listed in Table 1 may be the capacitance of the array with no DC bias voltage applied. The arrays may be tunable from about 10% to about 95% of the initial capacitance.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A tunable multilayer capacitor array comprising:
   a plurality of tunable multilayer capacitors including respective pluralities of interleaved electrodes and pluralities of dielectric layers respectively arranged between the pluralities of interleaved electrodes, wherein:
      at least a portion of each plurality of dielectric layers comprises a tunable dielectric material that exhibits a variable dielectric constant upon the application of an applied DC voltage to respective DC bias electrodes of the respective pluralities of interleaved electrodes,
      the plurality of tunable multilayer capacitors that are connected in parallel,
      the tunable multilayer capacitor array has an initial capacitance value greater than about 0.1 microFarads at an operating voltage greater than about 10 volts, and
      the tunable multilayer capacitor is configured to have a tunable capacitance by applying a DC bias voltage to the respective DC bias electrodes of the respective pluralities of interleaved electrodes of the tunable multilayer capacitor array.

2. The tunable multilayer capacitor array of claim 1, the applied DC bias voltage ranges from about 10 volts to about 300 volts.

3. The tunable multilayer capacitor array of claim 1, wherein the tunable multilayer capacitor has an initial volumetric efficiency associated with the initial capacitance value, and the initial volumetric efficiency is greater than about 10 microFarads per cubic centimeter.

4. The tunable multilayer capacitor array of claim 1, wherein the initial volumetric efficiency ranges from about 10 microFarads per cubic centimeter to about 500 microFarads per cubic centimeter.

5. The tunable multilayer capacitor array of claim 1, wherein the tunable multilayer capacitor array has an initial capacitance value greater than about 1 µF.

6. The tunable multilayer capacitor array of claim 1, wherein the capacitance of the tunable multilayer capacitor is tunable from about 10% to about 95% of the initial capacitance value.

7. The tunable multilayer capacitor array of claim 1, wherein the equivalent series resistance of the tunable multilayer capacitor array is less than about 10 mΩ.

8. The tunable multilayer capacitor array of claim 1, wherein the tunable multilayer capacitor array has a horizontal stack configuration wherein thicknesses of each of plurality of the tunable multilayer capacitors extends in a lengthwise direction of the tunable multilayer capacitor array.

9. The tunable multilayer capacitor array of claim 1, wherein the plurality of tunable multilayer capacitors comprises five or more tunable multilayer capacitors.

10. The tunable multilayer capacitor array of claim 1, further comprising at least one multilayer capacitor that is not configured to be tunable by an applied voltage.

11. The capacitor of claim 1, wherein the tunable multilayer capacitor array has a length from about 5 mm to about 50 mm.

12. The capacitor of claim 1, wherein the tunable multilayer capacitor array has a width from about 3 mm to about 15 mm.

13. The capacitor of claim 1, tunable multilayer capacitor array has a height from about 3 mm to about 15 mm.

14. The tunable multilayer capacitor array of claim 1, wherein each respective plurality of interleaved electrodes of each of the plurality of tunable multilayer capacitors comprise:
   a first active electrode in electrical contact with a first active termination;
   a second active electrode in electrical contact with a second active termination;
   a first DC bias electrode in electrical contact with a first DC bias termination; and
   a second DC bias electrode in electrical contact with a second DC bias termination.

15. The tunable multilayer capacitor array of claim 14, further comprising:
   a first lead frame connected with each first active termination; and
   a second lead frame connected with each second active termination.

16. The tunable multilayer capacitor array of claim 14, further comprising a first single lead connected with each first DC bias termination and a second single lead connected with second DC bias termination.

17. The tunable multilayer capacitor array of claim 14, wherein thicknesses of the plurality of dielectric layers of at least one of the plurality of tunable multilayer capacitors range from about 0.5 micrometers to about 50 micrometers.

18. The tunable multilayer capacitor array of claim 14, wherein the number of dielectric layers comprised by at least one of the plurality of tunable multilayer capacitors ranges from about 10 to about 700.

19. The capacitor of claim 14, wherein a total number of first and second active electrodes in at least one of the plurality of tunable multilayer capacitors ranges from about 100 to about 500.

20. The capacitor of claim 14, wherein the tunable dielectric material comprised by at least one of the plurality of the tunable multilayer capacitors has a voltage tunability coefficient of from about 10% to about 95%, wherein the voltage tenability coefficient is determined according to the following general equation:

$$T = 100 \times (\varepsilon_0 - \varepsilon_V)/\varepsilon_0$$

wherein,
   T is the voltage tunability coefficient;
   $\varepsilon_0$ is the static dielectric constant of the material without an applied voltage; and
   $\varepsilon_V$ is the variable dielectric constant of the material after application of an applied voltage (DC).

21. The capacitor of claim 20, wherein the static dielectric constant of the tunable dielectric material comprised by at least one of the plurality of the tunable multilayer capacitors is from about 100 to about 10,000 as determined in accordance with ASTM D2149-13 at an operating temperature of 25° C. and frequency of 1 kHz.

22. The capacitor of claim 20, wherein the tunable dielectric material comprised by at least one of the plurality of the tunable multilayer capacitors includes one or more ferroelectric base phases.

23. The capacitor of claim 20, wherein the tunable dielectric material comprised by at least one of the plurality of the tunable multilayer capacitors is a perovskite, tungsten bronze material, layered structure material, or a combination thereof.

24. A circuit comprising the tunable multilayer capacitor array of claim 1 and a power source that supplies a DC bias voltage to the capacitor through the respective DC bias electrodes of the respective pluralities of interleaved electrodes.

* * * * *